US007436824B2

(12) United States Patent
Pepenella

(10) Patent No.: US 7,436,824 B2

(45) Date of Patent: Oct. 14, 2008

(54) DISTRIBUTED SWITCH ARCHITECTURE INCLUDING A GROWTH INPUT/OUTPUT BUS STRUCTURE

(75) Inventor: Gerard Pepenella, Manorville, NY (US)

(73) Assignee: Silicon Laboratories Inc., Austin, TX (US)

(*) Notice: Subject to any disclaimer, the term of this patent is extended or adjusted under 35 U.S.C. 154(b) by 599 days.

(21) Appl. No.: 11/059,816

(22) Filed: Feb. 17, 2005

(65) Prior Publication Data

US 2005/0180410 A1 Aug. 18, 2005

Related U.S. Application Data

(60) Provisional application No. 60/545,240, filed on Feb. 17, 2004.

(51) Int. Cl.
*H04L 12/50* (2006.01)
*H04Q 11/00* (2006.01)

(52) U.S. Cl. .......................................... 370/386

(58) Field of Classification Search ................ 370/370, 370/380, 503, 538, 540, 357, 362, 375, 386, 370/387, 388, 395.7, 427
See application file for complete search history.

(56) References Cited

U.S. PATENT DOCUMENTS

| | | | | |
|---|---|---|---|---|
| 5,131,013 | A * | 7/1992 | Choi | 370/506 |
| 5,515,367 | A * | 5/1996 | Cox et al. | 370/404 |
| 5,777,761 | A * | 7/1998 | Fee | 370/225 |
| 5,852,600 | A * | 12/1998 | Russ | 370/228 |
| 2003/0048797 | A1* | 3/2003 | Sandstrom | 370/402 |
| 2003/0112831 | A1* | 6/2003 | Williams | 370/535 |
| 2004/0100994 | A1 | 5/2004 | Miller | |

* cited by examiner

*Primary Examiner*—Hassan Kizou
*Assistant Examiner*—Joshua Smith
(74) *Attorney, Agent, or Firm*—Zagorin O'Brien Graham LLP

(57) ABSTRACT

Multiple integrated circuits (ICs) are connected via growth inputs, into a network configuration, e.g. a ring network or a mesh network, to form a communications switch. Each IC includes additional growth inputs beyond those needed to form the switch. These growth inputs can be used to add additional functionality, e.g. protection or transmultiplexing, to the switch.

23 Claims, 12 Drawing Sheets

DISTRIBUTED SWITCH ARCHITECTURE INCLUDING A GROWTH INPUT/OUTPUT BUS STRUCTURE

BACKGROUND

1. Field of the Invention

This invention relates to telecommunications and more particularly to a switch utilized in a telecommunications network.

2. Description of the Related Art

Communications between different networks using various encoding techniques and multiplexing strategies has led to the development of a number of different switching technologies. These switching technologies are capable of receiving a signal composed of multiple embedded signals, and routing each individual embedded signal to different locations. For example, a common transmission protocol is the synchronous optical network protocol (SONET) specified by the American National Standards Institute (ANSI). SONET allows multiple data streams of different formats to be combined into a single high speed fiber optic synchronous data stream. Current switching technology breaks the SONET signal into its constituent parts, including the separate data streams. The separate data streams are routed appropriately, and then re-assembled into new SONET signals for further transmission.

Generally, the communication switches used in such applications are cross-connect switches employing time-space-time switching. These cross-connect switches receive multiple system inputs that are not frame aligned, and are possibly asynchronous to each other. The communication switch synchronizes and column aligns the inputs using a technique known as pointer processing (the first time component). The column aligned data are then stored in a large central memory (the space component), from which the correct data is selected to create a framed data signal (the second time component). Some other switches employ an elastic memory buffer, which can reduce the need for a large central memory.

Regardless of which type of switch is employed, it is often inconvenient to add functionality to conventional switches. Implementing trans-multiplexing functions in conventional switches (i.e. functions allowing access to additional levels of data channels embedded within embedded data streams), for example, usually requires either a multi-stage switch or multiple passes through a single stage switch. Adding other functionality to conventional switches, for example, redundancy or other protective functions, can require adding both redundant switch elements and extra communication/routing elements.

SUMMARY

An integrated circuit cross-connect switch may be used to implement a data switch. The integrated circuit includes, in one embodiment, a transmission input port for receiving communications data, a transmission output port for supplying transmission output data, and multiple growth inputs and growth outputs. Each of the growth outputs is coupled to either a transmission input port, one of the growth inputs, or to a data path that supplies data to the transmission output port. Some of the growth inputs and outputs are used to form a distributed switch which includes multiple integrated circuits. The integrated circuit includes at least one additional growth input and growth output that is not needed in forming the distributed switch.

Additional growth inputs and outputs of the integrated circuit may be used to incorporate various adjunct functions into the distributed switch. Such functions include trans-multiplexing, which involves extracting multiple levels of embedded data streams from within a higher level data stream, protection functions, such as total or partial redundancy of the integrated circuit cross-connect switches that make up the distributed switch, or other similar "non-core" switch functions.

In another embodiment, an apparatus including multiple integrated circuits is provided. Each of the integrated circuits includes a transmission input port for receiving communications data, a transmission output port for supplying transmission output data, a first group of growth inputs, and a first group of growth outputs. Each of the first group of growth inputs and the first group of growth outputs is coupled to at least one of the other integrated circuits included in the apparatus. Each of the integrated circuits also includes at least one extra growth input and one extra growth output, which may be used to implement adjunct functions. In a particular embodiment, the apparatus includes N integrated circuits, with N being greater than or equal to four. In such an embodiment, the first group of growth inputs and the first group of growth outputs are formed by at least n−1 growth inputs and outputs respectively.

In embodiments including multiple integrated circuits (ICs), the ICs may be coupled in a unidirectional or bidirectional ring using the growth inputs and outputs, such that the coupled ICs form a distributed switch. In other embodiments, the ICs may be coupled in a full mesh network, with the growth inputs and outputs of each integrated circuit being coupled to the growth inputs and outputs of other integrated circuits in a mesh pattern.

An apparatus according to another embodiment of the present invention includes multiple integrated circuits connected as a distributed switch, with each of the integrated circuits functioning as either a working channel device or a protection channel device. The protection channel device includes a transmission input port for receiving communications data, a plurality of protection device growth inputs, and a plurality of protection channel device growth outputs. The protection channel device also includes a transmission output port selectively connected to either the transmission input port or one of the protection channel device growth inputs. The protection channel device receives respective working channel data information from respective extra growth outputs of the working channel devices.

The protection channel device can respond to a failure condition, in which an output of a particular working channel device fails, by connecting to the transmission output port of the protection device a particular protection channel device growth input, which receives data from the extra growth output of the particular working channel. In other embodiments, in response to a failure condition associated with the transmission input port of a working channel device, the protection channel device is connected to a working channel that is in turn connected to the particular working channel device with the failure condition. The working channel device couples its extra growth input, which is coupled to the protection device, to its transmission output port.

The number of protection devices may be varied such that a desired number of protection devices M provide protection for a number N of working channel devices. In at least one embodiment, the integrated circuits can be coupled as a two stage switch.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
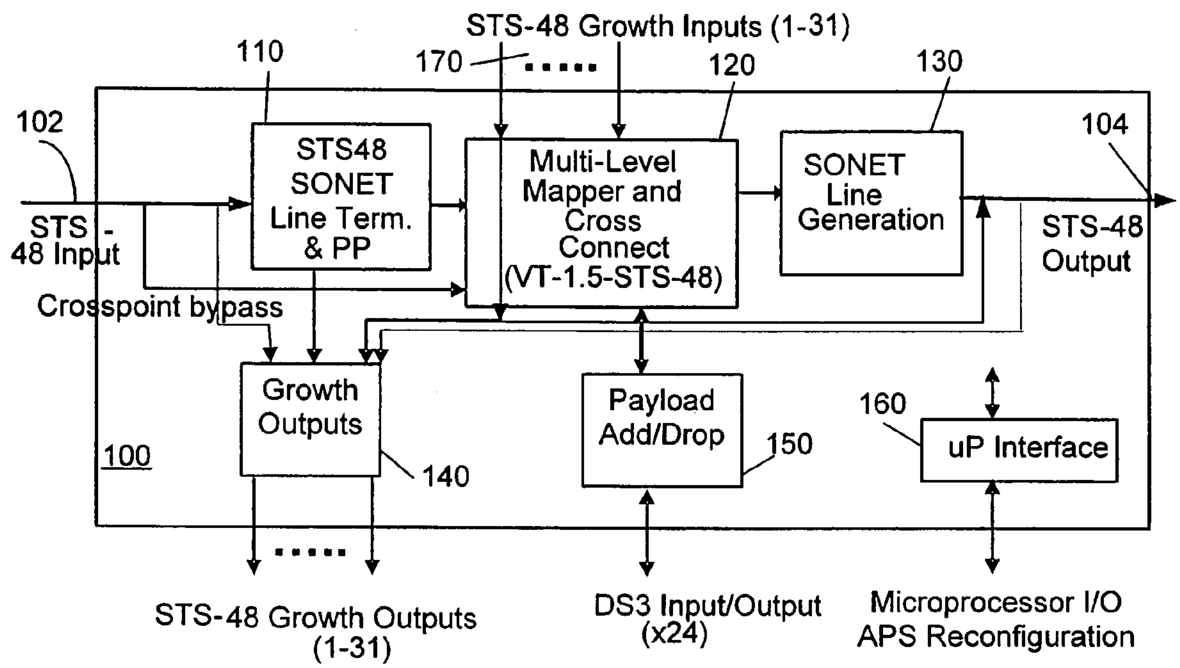
FIG. 1 is a block diagram illustrating an integrated circuit cross-connect switch including growth inputs and growth outputs according to an embodiment of the present invention.

Referring first to FIG. 1, the integrated circuit cross-connect switch according to an embodiment of the present invention will be discussed, and is designated generally switch 100. Switch 100 includes line terminator and pointer processor (LTPP) 110, cross-connect 120, line generator 130, growth outputs 140, payload add/drop unit 150, microprocessor interface 160 and growth inputs 170. A portion of an STS-48 data stream is received at input 102 of switch 100, and is nominally provided to LTPP 110. LTPP 110 is connected to cross-connect 120, which maps and switches virtual tributaries (VTs) or other data streams embedded in the STS-48 input to the proper STS-48 output. Note that the output to which the data stream is mapped may be either output 104 of switch 100 or the output of another switch (not shown) connected to switch 100 via growth outputs 140.

The output of cross-connect 120 is connected to line generator 130, which reconstructs the data streams provided by cross-connect 120 into a format suitable for transmission, such as a SONET format. Line generator 130 outputs an STS-48 formatted signal in the illustrated embodiment. Payload add/drop 150 is connected to cross-connect 120, and performs a dual input/output function. For example, if a new DS3 data stream is to be included in the STS-48 output generated by line generator 130, but the DS3 data stream is not in the original STS-48 input received at input 102, the data stream to be added may be provided to cross-connect 120 through payload add/drop 150. In at least one embodiment, payload add/drop 150 is used to add a data stream into switch 100, or to remove a data stream that is not to be transmitted via the STS-48 signal output by switch 100.

Note that growth inputs 170 are also connected to cross-connect 120. In at least one embodiment, multiple switches similar to switch 100 are connected to form a distributed switch that handles an entire STS-48 data stream by applying a portion of the STS-48 data stream corresponding to a single STS 1 to each of the interconnected IC cross-connect switches, including switch 100. If a data stream, such as a virtual tributary (VT), is not to be output by switch 100, but instead is to be output by one of the connected switches (not shown) then cross-connect 120 will deliver the VT to the proper switch via growth outputs 140. Likewise if another switch receives a data stream to be output by switch 100, then the other switch will provide the data stream to switch 100 through growth inputs 170. The interconnection of multiple switches using growth inputs 170 and growth outputs 140 will be discussed subsequently.

Within switch 100, growth inputs 170 are connected to both growth outputs 140 and STS-48 output 104. Growth outputs 140 are connected to growth inputs 170, input 102, output 104, and LTPP 110.

Figure 2:
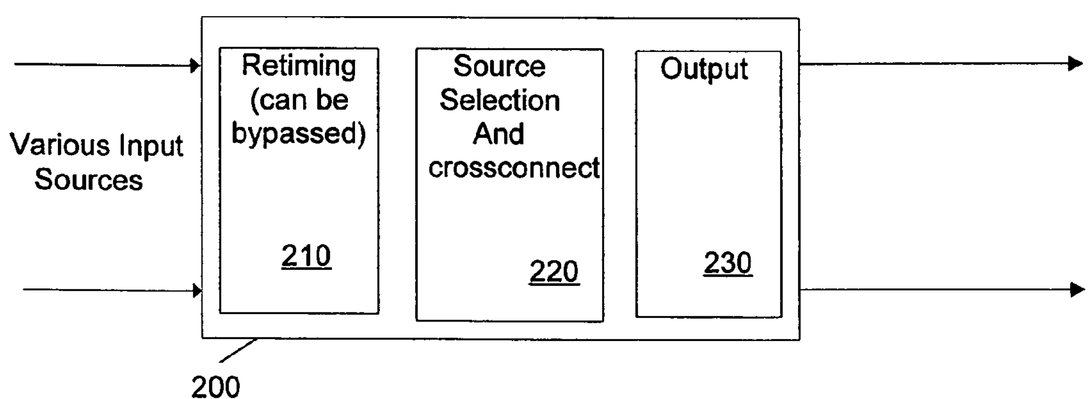
FIG. 2 is a block diagram illustrating the basic functional blocks of an integrated circuit cross-connect switch according to an embodiment of the present invention.

Referring next to FIG. 2, a functional block diagram of a cross-connect switch according to an embodiment of the present invention which may be utilized in cross connect 120 is illustrated, and designated generally as switch 200. Switch 200 includes retiming unit 210, source selection and cross-connect unit 220 and output unit 230. Nominally, switch 200 receives input from various sources, retimes the input in retiming unit 210, switches the data stream in source selection and cross-connect unit 220, and outputs the data stream from output unit 230.

Figure 3:
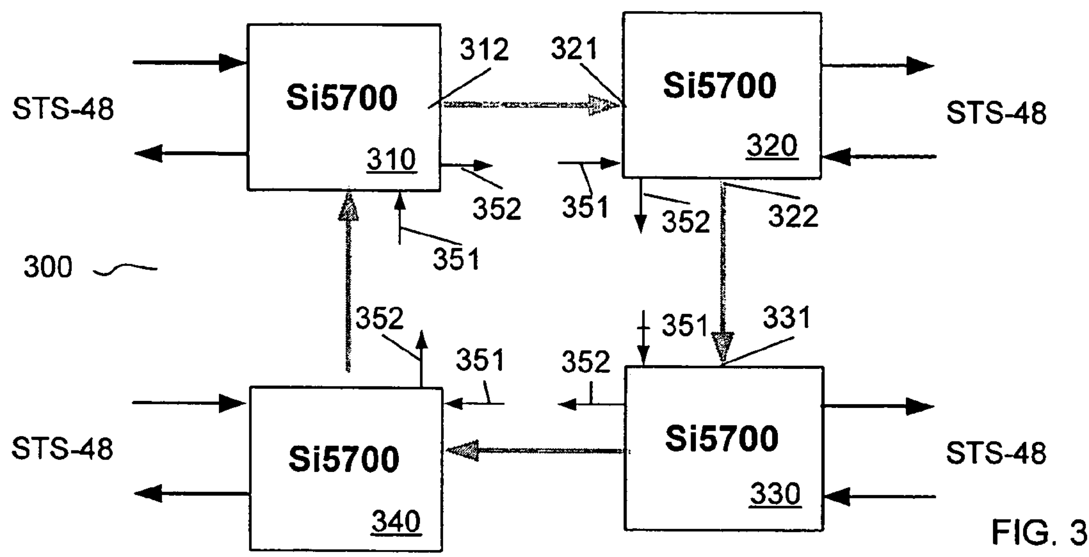
FIG. 3 is a block diagram illustrating multiple integrated circuits connected in a unidirectional ring utilizing the growth inputs of the integrated circuits according to an embodiment of the present invention.
Figure 4:
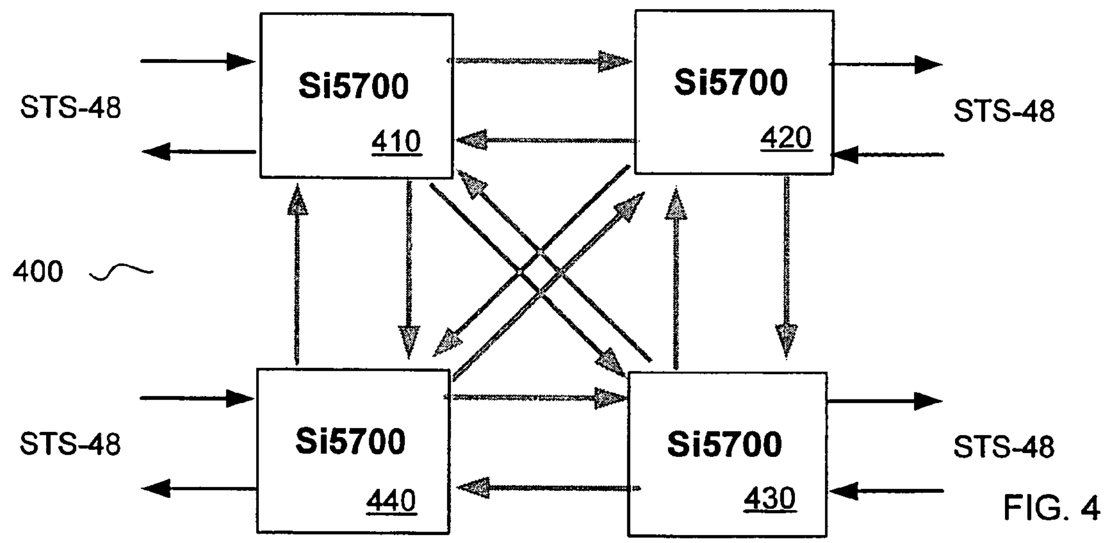
FIG. 4 is a block diagram illustrating multiple integrated circuits connected in a mesh using the growth inputs of the integrated circuits according to an embodiment of the present invention.
Figure 5:
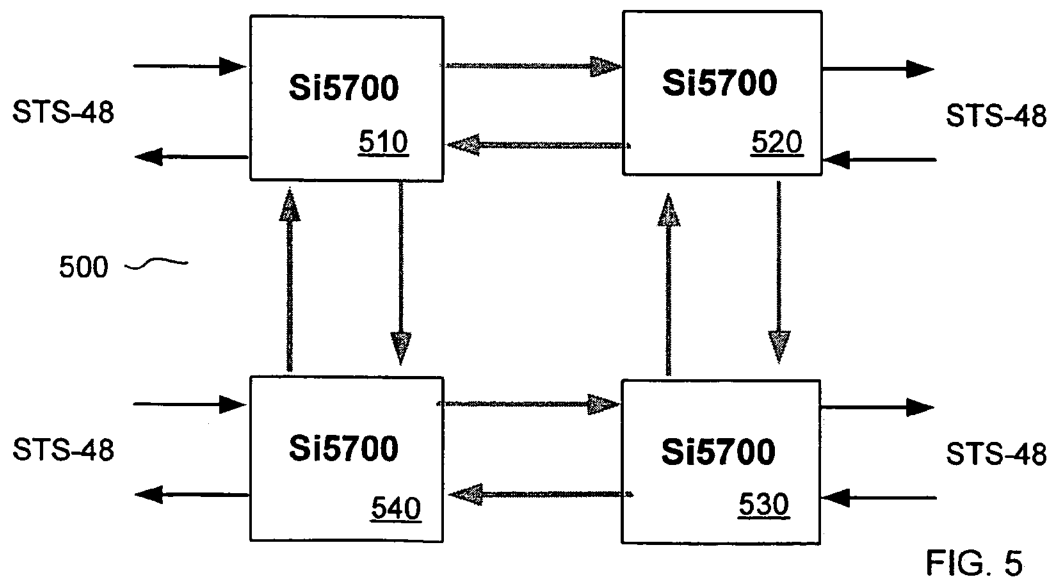
FIG. 5 is a block diagram illustrating multiple integrated circuits connected in a bi-directional ring using the growth inputs of the integrated circuits according to an embodiment of the present invention.

Referring next to FIGS. 3 through 5, three possible switch configurations including multiple IC cross-connect switches are illustrated according to various embodiments of the present invention. In FIG. 3, distributed switch 300 is connected in a unidirectional ring configuration. In FIG. 4, distributed switch 400 is connected in a full mesh configuration. In FIG. 5, distributed switch 500 is connected in a bi-directional ring configuration. Although not illustrated, various other switch configurations are also possible, for example, one or more of the switch configurations illustrated in FIGS. 3 through 5 may be combined. Regardless of the exact configuration chosen for the distributed switch, in preferred embodiments the individual IC cross-connect switches are connected to each other via growth inputs and growth outputs, and include more growth inputs and/or growth outputs than are needed for a basic switch configuration.

For example, in the unidirectional ring configuration illustrated in FIG. 3, IC cross-connect switches 310, 320, 330 and 340 each include at least one additional growth input 351 and growth output 352 beyond the number needed to form a unidirectional ring. A growth output 312 of integrated circuit 310 is connected to a growth input 321 of integrated circuit 320. Likewise, a growth output 322 of integrated circuit 320 is connected to the growth input 331 of integrated circuit 330. The unidirectional ring configuration illustrated by switch 300 uses a minimum number of growth inputs and outputs compared to other distributed switch configurations.

The bi-directional ring arrangement illustrated in FIG. 5, uses two growth inputs and growth outputs for each IC cross-connect switch 510, 520, 530 and 540. Like the IC cross-connect switches 310, 320, 330 and 340 used in the unidirectional ring configuration of FIG. 3, IC cross-connect switches 510, 520, 530 and 540 each include additional growth inputs and outputs (not illustrated) beyond those needed for forming the basic switch structure. While the bi-directional ring configuration uses more growth inputs and growth outputs than the unidirectional ring configuration, the bi-directional ring configuration can decrease the maximum routing delay incurred by any particular data stream.

Connecting the IC cross-connect switches 410-440 in a full mesh configuration as illustrated in FIG. 4 uses the most growth inputs and outputs of the three illustrated configurations. The full mesh configuration, however, imposes the least maximum delay path between any particular IC cross-connect switch 410-440, and any other IC switch. Each IC cross-connect switch 410-440 also includes at least one additional growth input and/or growth output beyond the number needed to implement the basic full mesh configuration (not shown).

Figure 6:
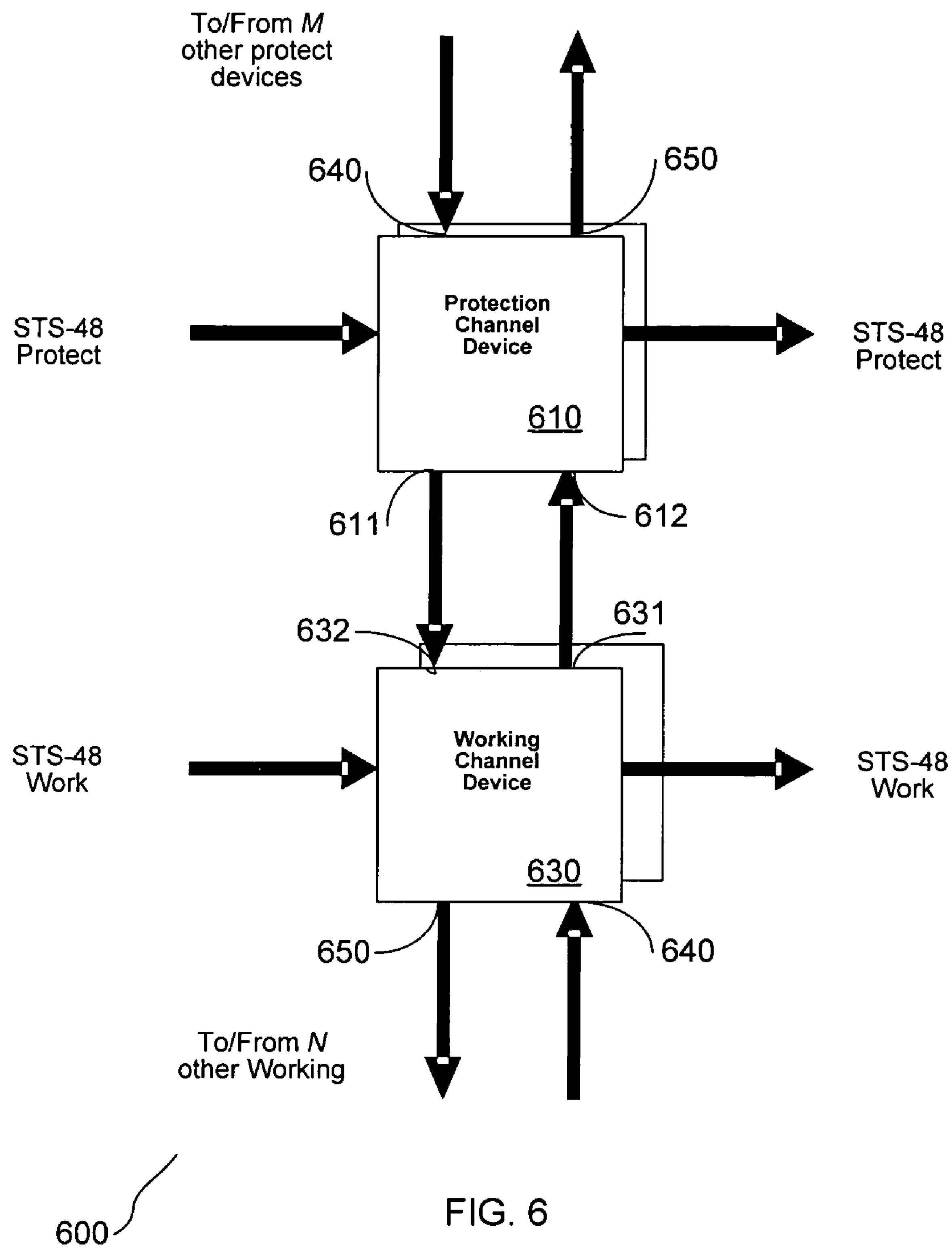
FIG. 6 is a block diagram illustrating a cross-connect switch that includes a work channel device and a protection channel device according to an embodiment of the present invention.

Referring next to FIG. 6, an example of a protection function implemented using one or more extra growth inputs and/or outputs is illustrated according to an embodiment of the present invention. Switch portion 600 includes working channel device 630 and protection channel device 610. Both working channel device 630 and protection channel device 610 include multiple growth inputs and growth outputs. Working channel device 630 has one of its growth inputs 632 connected to a growth output 611 of protection channel device 610, and protection channel device 610 has one of its growth inputs 612 connected to a growth output 631 of working channel device 630.

Both protection channel device 610 and working channel device 630 include an additional growth input 640 and growth output 650 to connect to other devices. Thus, working channel device 630 may connect to and from N other working channel devices through its growth inputs and outputs, while protection channel device 610 may connect to Mother protection channel devices. In effect, working channel device 630 includes enough growth inputs and outputs to connect to other working channel devices to form a distributed switch, and includes at least one additional growth input and growth output to connect to protection channel device 610. Protection channel device 610 includes enough growth inputs and growth outputs to connect to M other protection devices, and an additional growth input and output to connect to working channel device 630.

In operation, switch portion 600 nominally performs switching functions using working channel device 630, and any other working channel devices (not illustrated) to which working channel device 630 is connected. Protection channel device 610, and any other protection channel devices (not illustrated) to which protection channel device 610 is connected may operate in a number of different modes, but nominally protection channel device 610 provides redundancy in the event of a failure of working channel device 630. So, for example, if working channel device 630 malfunctions, protection channel device 610 can take over all or part of the function of working channel device 630, so that the function of switch portion 600 is not impaired.

In one embodiment, for every working channel device present in a distributed switch network, a corresponding protection channel device is provided. In other embodiments, a single protection channel device may be used to protect more than one working channel device. The exact number of protection devices per working channel device can be varied as desired by those skilled in the art.

In some embodiments of the present invention, protection channel devices may help process data streams under non-failure conditions, thereby providing extra processing power during peak loads, or otherwise. In such embodiments, however, when a failure of a working channel device is detected, the protection channel device will be reallocated from performing normal processing to performing protection/backup processing for the failed working channel unit. In other embodiments, protection channel devices may not perform independent processing during non-failure conditions, but instead may perform duplicate processing to that performed by a working channel device to which the protection channel device is assigned. Thus, relatively constant redundant processing is performed under non-failure conditions. In yet other embodiments, the protection channel device may sit idle until it is needed. Note that working channel device 630 may be part of a distributed switch configured as a mesh, a unidirectional ring, a bi-directional ring network or otherwise. Likewise, protection channel device 610 may be also part of a network of protection devices.

Figure 7:
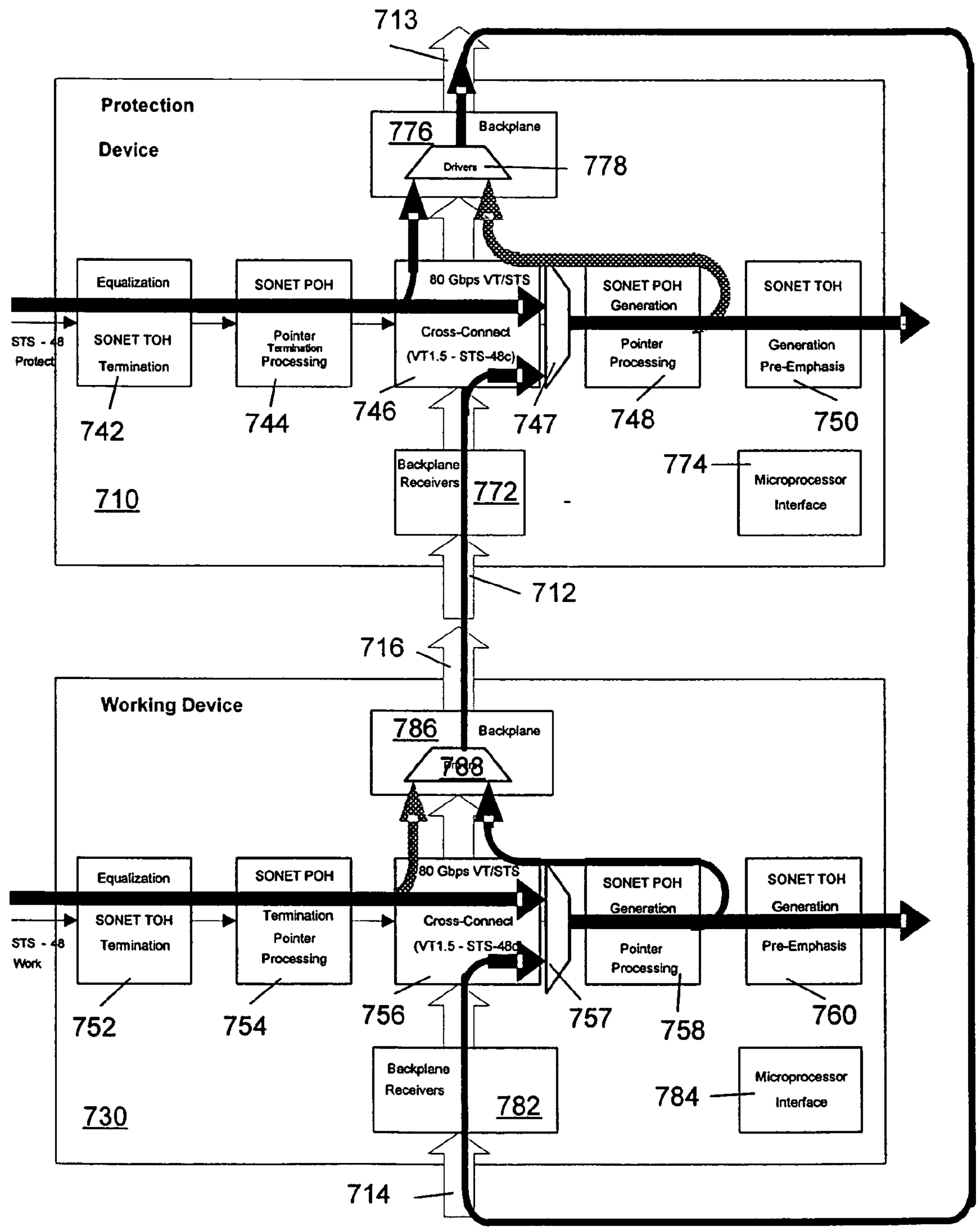
FIG. 7 is a combination block diagram/flow diagram illustrating a number of possible data paths for information being switched in a cross-connect switch including a protection device according to an embodiment of the present invention.

Referring next to FIG. 7, various Ways in which a protection device can be used in conjunction with a working channel device will be discussed. For ease of understanding, assume that working device 730 is connected in a unidirectional ring configuration to form a distributed switch. Assume furthermore that a one to one correspondence exists between protection devices and working devices, such that each working device is accompanied by a protection device that is not itself part of a ring or mesh configuration. Note, however, that such restrictions are arbitrarily assumed for ease of explanation only, and that working device 730 could in fact be connected to other working devices or be serving as a stand alone switch. Likewise, protection device 710 could be part of a protection device network configured in a undirectional ring, bidirectional ring, or a mesh configuration. In addition, protection device 710 may be configured to provide protection for more than one working device.

Consider first the operation of working device 730 under normal operating conditions. A data stream enters working device 730 at SONET termination 752. SONET termination 752 handles the transport overhead (TOH). The data stream is passed from SONET termination 752 to termination pointer processor (TPP) 754. In TPP 754, working device 730 examines the pointer overhead (POH) of the data stream and processes the data stream accordingly. The data stream proceeds to cross-connect 756, where particular data streams are switched as indicated by the POH. After being switched in cross-connect 756, the data stream enters multiplexer 757, which multiplexes the various data streams and provides the multiplexed data streams to pointer processing generator 758 which reinserts the POH into signals received from cross-connect 756 and/or backplane receivers 782. After having the POH reinserted, the data stream is provided to pre-emphasis generator 760, which adds transportation overhead bits (TOH) to the data stream for transmission over a SONET network.

Note that working device 730 includes alternate data paths, so that under particular circumstances data may not follow the exact path just described. One such alternative path is through termination pointer processor 754 to drivers 788 in back plane 786. Another such path is from the output of pointer processing generator 758 to driver 788. Both of these data paths are fed through growth inputs in working device 730 so that the data can be provided to other working devices, or to protection devices, as desired.

Note also that back plane receivers 782 in working device 730 are configured to receive a data stream from another device, such as another working device (not illustrated) or protection device 710. Data streams received through back plane receivers 782 can be multiplexed with other data streams using multiplexer 757. In that case, pointer processing generator 758 receives data streams from both the pointer processor 254 and from devices connected through back plane receiver 782. Alternatively, multiplexer 757 may be controlled using microprocessor interface 784 to select between the data streams received at back plane 782 and the original data streams provided by TPP 754. In that case, the data streams received at pointer processing generator 758 are either the data streams received through back planes receiver 782 or the original data streams.

Note that protection device 710 includes SONET termination 742, termination pointer processor 744, cross-connect 746, pointer processing generator 748, multiplexer 747, generation pre-emphasis 750, back plane receivers 772, drivers 778, back plane 776 and microprocessor interface 774. Each of these components in protection device 710 operates in a manner similar to corresponding components in working device 730. Thus, in this embodiment, protection device 710 and working device 730 are interchangeable. Note also, that protection device 710 can process a data stream, and includes similar data stream connections to those of working device 730.

Still referring to FIG. 7, consider the situation in which a failure occurs in a distributed switch that includes a number of working devices such as working device 730, and wherein each working device is protected by a corresponding protection device 710. In such a case, protection device 710 can provide redundancy, and/or backup protection for working device 730 as follows. Under normal operating conditions, working channel data from working device 730 is channeled to growth inputs 712 of protection device 710 through growth outputs 716. Note that growth inputs 712, 714, and growth outputs 713, 716, are in addition to the growth inputs and outputs (not illustrated) used to connect working device 730 to the remainder of the distributed switch. During normal operation both working device 730 and protection device 710 may each carry different traffic channels. In the event of a working device failure, however, microprocessor interfaces 774 and 784 will configure working device 730 and protection device 710 to route the working channels' data stream 730 to protection device 710. Protection device 710 will then take over some or all of the processing responsibilities of working device 730.

For example, consider the case where the input data to working device 730 is interrupted. In such a case, the input of protection device 710 is connected to the data stream being processed by working device 730, and protection device 710 ceases other processing and begins processing the working channel data stream. The working channel data will be received at protection device 710 through SONET termination 742, passed through pointer processing terminator 744, through drivers 778 and back plane 776, and through backplane receiver 782 in working device 730. Once the working channel data reaches cross-connect 756 in working device 730, microprocessor interface 784 controls multiplexer 757 to select the working channel data received from protection device 710. In effect, SONET termination 742 and TPP 744 of protection device 710 take the place of SONET termination 752 and TPP 754 in working device 730. In this way, a failure at the input of working device 730 can be overcome by processing the working channel data stream through at least part of protection device 710.

If a failure occurs near the output of working device 730, protection device 710 may again be used to supplement the operation of working device 730. The working channel data output by pointer processing generator 758 is routed through the growth outputs 716 of working device 730 to the growth inputs 712 of protection device 710. Microprocessor interface 774 in protection device 710 causes multiplexer 747 to pass the working channel data stream received from working device 730 to generation pointer processor 748. Generator pointer processor 748 then provides the working channel data stream to generation pre-emphasis 750. The output of protection device 710 is then used in place of the output of working device 730. In this way, protection device 710 can provide backup and redundancy for an output failure of working device 730.

In other embodiments, a single protection device 710 may be connected to multiple working devices. In the event that any connected working device fails, the working channel data stream of the failed device can be re-routed using the growth inputs and outputs of protection device 710 and the failed working device. Re-routing the working data stream provides continued operation of a distributed switch, even though a portion of the distributed switch has failed.

Figure 8:
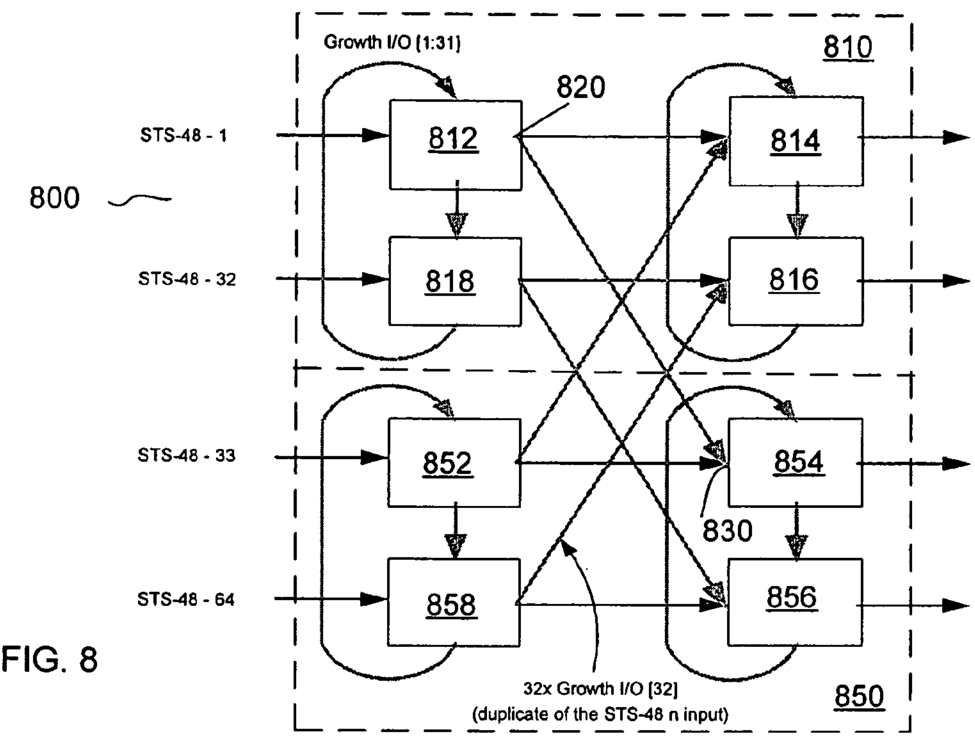
FIG. 8 is a block diagram illustrating a two stage switch according to an embodiment of the present invention.

Consider next FIG. 8 in which a multistage switch according to an embodiment of the present invention is illustrated. Multistage switch 800 includes two stages, first stage 810 and second stage 850. First stage 810 includes switching devices 812, 814, 816 and 818, while second stage 850 includes switching devices 852, 854, 856 and 858. The two stages are connected together using additional growth inputs/outputs on each of the switch devices. For example, extra growth outputs 820 on switch element 812 of first stage 810 are connected to growth inputs 830 of switch element 854 of second stage 850. The extra growth IO connections are configured to provide copies of the particular data streams being handled by first stage 810 and second stage 850 to the respective other switch stage.

Figure 9:
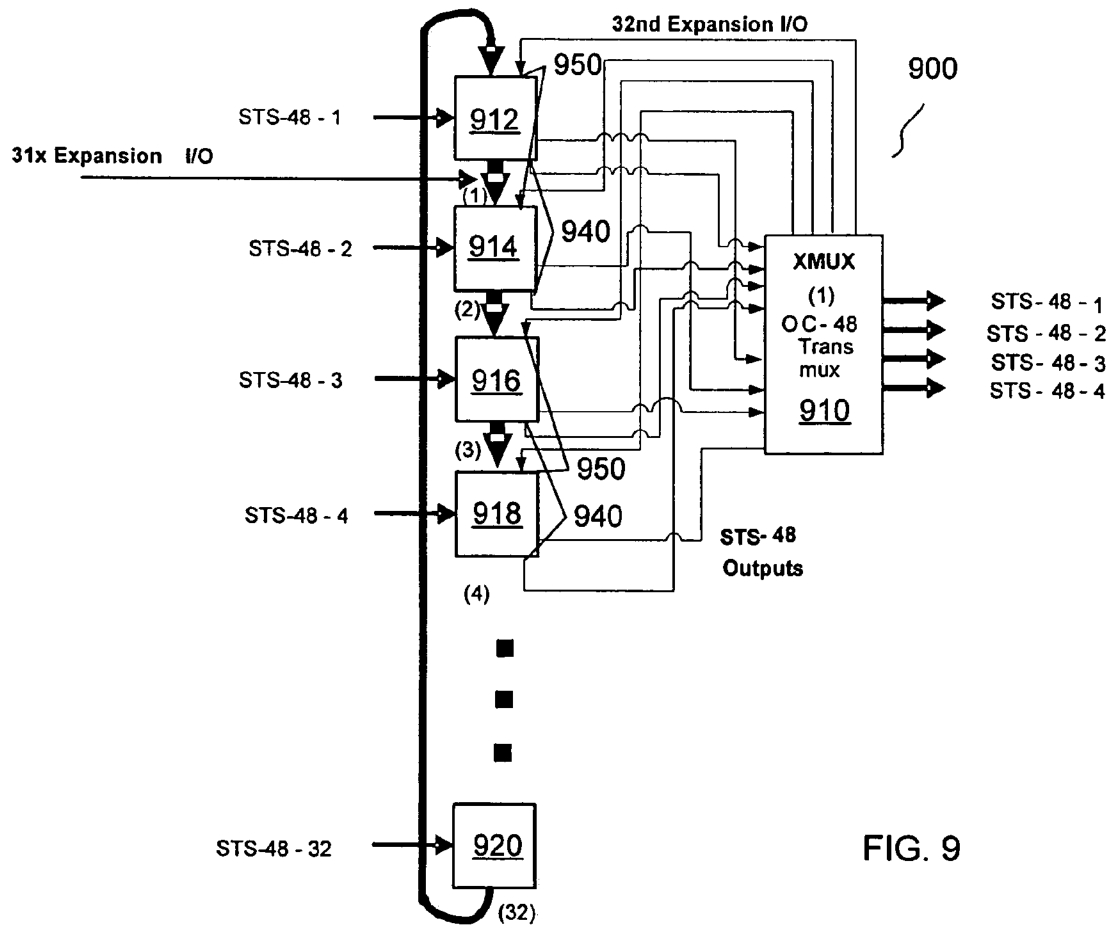
FIG. 9 is a block diagram illustrating the use of growth inputs and outputs included on each integrated circuit of a cross-connect switch to implement a trans-multiplexing function according to an embodiment of the present invention.

Referring next to FIG. 9, a trans-multiplexing function is added to the basic switch function of a distributed switch 900 according to an embodiment of the present invention. Distributed switch elements 912, 914, 916, 918 and 920 each correspond to an IC cross-connector switch 800 connected, in a unidirectional ring. Additional growth inputs and outputs on each of the integrated circuit cross-connect switches 912-918 are connected to trans-multiplexer 910. In one embodiment, up to four IC cross-connect switches route their data streams to the trans-multiplexer 910 through extra growth outputs 940. Each of the data streams are mapped to virtual tributaries (VTs), and the VTs are mapped to FTS1 and routed back to the IC cross-connect switches 912-918 through the extra growth inputs 950 of the integrated circuit cross-connect switches. Routing the data streams to XMUX 910 via extra growth inputs and outputs allows non-core functionality to be added to distributed switch 900 in an integrated fashion, without reducing the overall capacity of the switch. The need for either a two-stage switch or multiple processing through a single-stage switch is also obviated.

Figure 10:
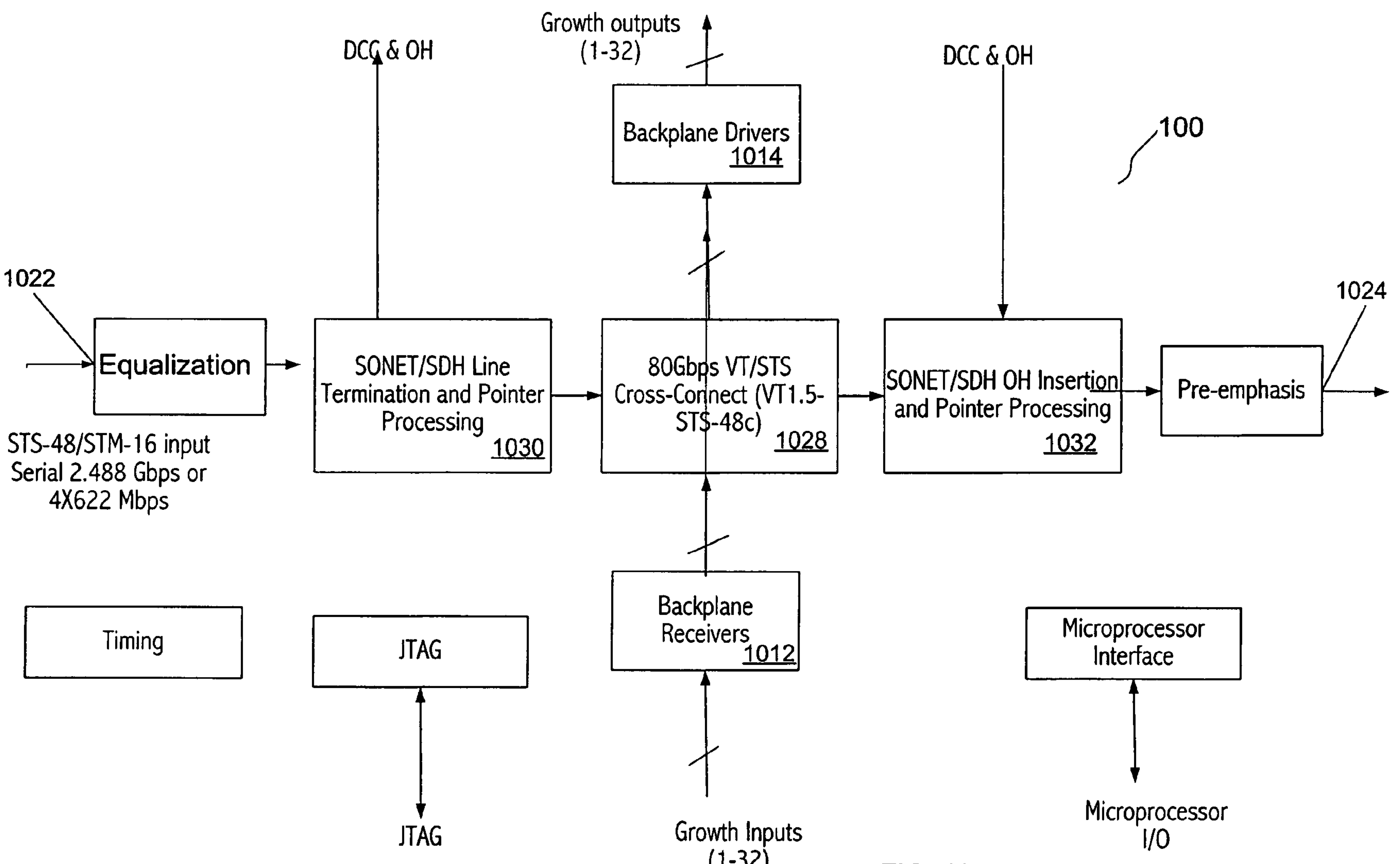
FIG. 10 is a block diagram of an integrated circuit according to an embodiment of the present invention.

Referring next to FIG. 10, a more detailed description of switch 100 according to an embodiment of the present invention is discussed. Switch 100 is a linearly-scalable device capable of implementing a fully non-blocking framing/mapping/pointer processing and cross-connect switch from the VT level through STS-48c. Switch 100 can be provisioned to switch any SONET level simultaneously, allowing a mix of VT and STS grooming within the same architecture. Switch 100 provides performance monitoring, intermediate path monitoring, and reporting capabilities on all VT and STS signals. Reliable network operations may be enhanced by bridge and roll switching.

In a preferred embodiment, up to 32 multiple Grooming Switches can be interconnected to deliver 80 Gbps of switching capacity in a single stage. UPSR switching based on user-defined thresholds can be fully implemented in silicon, and other network topologies, including linear 1+1, are also supported. One embodiment of Switch 100 supports substantially all associated aspects of SONET and SDH. Note that for clarity and ease of explanation, the discussion may refer primarily to SONET.

An embodiment of Switch 100 includes a framed STS-48/STM-16 input/output 1022, 1024 for efficient switch sizing and growth. A switch using switches such as Switch 100 is, in one embodiment, linearly scalable to 80 Gbps in a single stage using 32 distributed or collocated devices. Switch 100 also includes integrated 2.5 and 3.1 Gbps backplane transceivers 1012, 1014 for device interconnect (40" of FR4) and a fully non-blocking VT/STS cross-connect 1028 useful for valid combinations of VT1.5, VT2, TU-11, TU-12, STS-1/STM-0, STS-3c/STM-1, STS-12c/STM-4, STS-48c/STM-16; etc.

Switch 100 may also support linear 1+1 and UPSR network topologies, as well as interconnected rings; full SONET/SDH overhead processing for all transport and path overhead bytes, SONET/SDH-compliant defect and anomaly detection and reporting, SONET/SDH intermediate path monitoring (IPM) for STS/STM and VT/VC signals, SONET and SDH (TU-3 and AU-3) mapping capabilities, 2.5 Gbps serial CML or 4×622 Mbps, LVDS line interfaces, VT/NVC and STS/STM hitless bridge and roll, full or partial broadcast capability; test pattern generation and checking, on line and growth I/O, and SONET/SDH gateway capability. A preferred embodiment also complies with applicable Telcordia, ANSI, ITU, and ETSI standards and is compatible with Metro and access SONET/SDH systems, Core SONET/SDH systems, PDH to SONET/SDH systems, and SONET/SDH gateways.

In one embodiment, Switch 100 uses a SONET grooming architecture to implement a VT/STS grooming switch. VT and STS level framing, pointer processing, and grooming may be integrated in a single device. Following SONET descramble and frame alignment, Switch 100 performs SONET overhead termination and pointer processing in TPP 1030. Pointer processing is done on both low order VT payloads as well as high order STS payloads, depending on the mix of tributaries in the STS-48 input. The multilevel cross-connect 1028 is capable of switching at multiple SONET levels simultaneously, allowing for a mix of STS and VT grooming within the same device. In a fully-configured 80 Gbps single-stage VT switch, each device cross-connect is capable of switching between any of the 32×1344 VT1.5 input channels and its 1344 VT1.5 output channels. In addition, Switch 100 supports broadcast capabilities.

Following the cross-connect 1028, the Switch 100 performs VT and STS level SONET overhead generation in Generation Pointer Processor 1028. A framed STS-48 output is provided on either a serial 2.5 Gbps or 4×622 Mbps interface 1024, which may be connected to other system resources or output directly via an OC-48 transceiver. Comprehensive SONET performance monitoring statistics can be collected on every STS and VT channel. Intermediate path performance monitoring (IPM) is available for all STS and VT signals. In addition, in some embodiments, the Switch 100 provides SONET-compliant defect and anomaly detection and reporting. A configurable interrupt pin may be available on the device to quickly report events affecting SONET service. A second interrupt pin may be dedicated for APS support.

In a preferred embodiment, the device growth I/O are independent, 3.1 Gbps backplane transceivers 1012, 1014. Each growth output may have configurable pre-emphasis settings and programmable drive strengths, the latter of which may be used to minimize power consumption in close proximity applications. Adaptive equalization may also be used on each growth input. These features allow the Switch 100 to communicate directly across high-speed backplanes and eliminate the need for external backplane devices.

Figure 11:
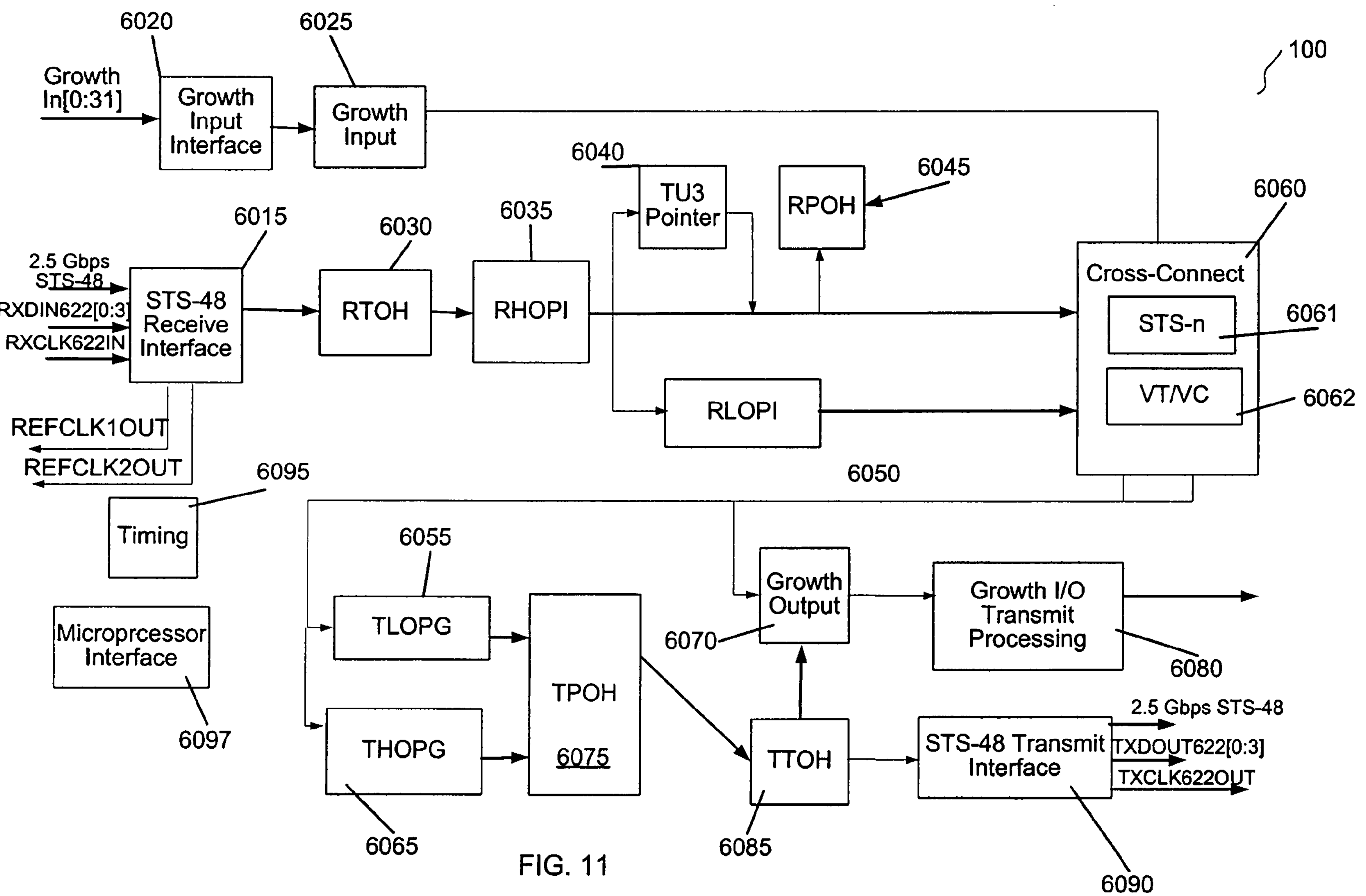
FIG. 11 is a block diagram illustrating operational functions of an integrated circuit according to an embodiment of the present invention.

Referring next to FIG. 11, a block diagram illustrating different functional blocks of a Switch 100 will be discussed according to an embodiment of the present invention. Each of the functions discussed with reference to FIG. 11 may be implemented using portions of one or more of the system elements illustrated in FIGS. 1 and 10. The Switch 100 includes 18 functional blocks that, in combination, provide an expandable VT cross-connect with capacities between 2.5 Gbps and 80 Gbps in linear growth steps. Switch 100 performs SONET transport overhead-termination and generation. It also implements pointer processing at both the STS and VT levels to extract the VT signals. The multilevel cross-connect can be provisioned for any VT, STS-n level, allowing for a mix of tributaries either with or without VT Groups.

In at least one embodiment, Receive Interface Block 6015 is a serial 2.5 Gbps interface incorporating pre-emphasis to allow up to 40" of FR-4 plus two connectors, and includes the CDR and SERDES functions as well as equalization. An alternative to the serial 2.5 Gbps interface is a clocked 4-bit parallel 622 Mbps interface.

Receive Trace Overhead (RTOH) Block 6030 performs SONET section and line overhead processing. Receive High Order Pointer Interpreter (RHOPI) Block 6035 performs overhead processing for signals that are cross-connected at the STS-n level. Receive Path Overhead (RPOH) Block 6045 terminates the SONET path level overhead for STS-1 signals with VT1.5 payloads that are cross-connected. Receive Low Order Pointer Interpreter (RLOPI) Block 6050 processes the VT1.5 pointers and overhead.

Growth Input Interface Block 6020 performs CDR and equalization functions for the Growth Input lines. Growth Input (GI) Block 6025 and Growth Output (GO) Block 6070 provide point-to-point data links between switching devices. Growth Output Interface (GOI) Block 6080 provides the SERDES and pre-emphasis functions for the Growth Output lines. Cross-connect Block 6060 includes an STS-n level cross-connect 6061, and a VT level cross-connect 6062. Transmit Low Order Pointer Generation (TLOPG) Block 6055 performs the pointer and overhead processing for VT1.5 and VT2.0 level signals. Transmit High Order Path Generator 6065 performs the overhead processing for the STS-n level signals.

Transmit Path Overhead (TPOH) Block 6075 processes the path overhead bytes for the transmit signal. Transmit Trace Overhead Block 6085 performs SONET line and section processing. STS-48 Transmit Interface Block 6090 performs the SERDES and pre-emphasis functions for the STS-48 output. Microprocessor Interface 6097 provides control and data information to an external microprocessor. Timing Block 6095 provides clock extraction and synchronization functions for the high-speed communication lines (Data and Growth).

In one embodiment, framing and pointer processing is done within switch 100. Each device accepts a framed STS-48 and creates a single STS-48 output. Growth I/O allows the user to interconnect 32 devices to create 80 Gbps of any combination VT1.5 through OC-48c level single-stage switching. The STS-48 I/O can be serial, 4×622 Mbps or otherwise. As noted earlier, equalizer and pre-emphasis circuitry may be provided on the serial interface to provide a flexible system layout of up to 40" of FR-4 trace for these signals. For shorter traces, the circuitry for the equalizer and pre-emphasis may be powered down and transmit voltage levels reduced to minimize power consumption.

In at least one embodiment, growth inputs and outputs run at 3.11 Gbps serial and utilize integrated backplane transceivers. The backplane transmitters provide programmable pre-emphasis drive strength, and the receivers implement dynamic equalization. These features allow Switch 100 to communicate directly across high-speed backplanes. In turn, this allows systems to implement a grooming switch and associated adjunct functions on a single card or distributed across multiple port cards using only the power required for the specific implementation.

Switch 100 provides, in one embodiment, a full 32-bit microprocessor bus interface and significant levels of processing of the SONET maintenance and administration functions. This allows systems to support necessary maintenance and administration requirements with a minimum of system processor interaction.

Figure 12:
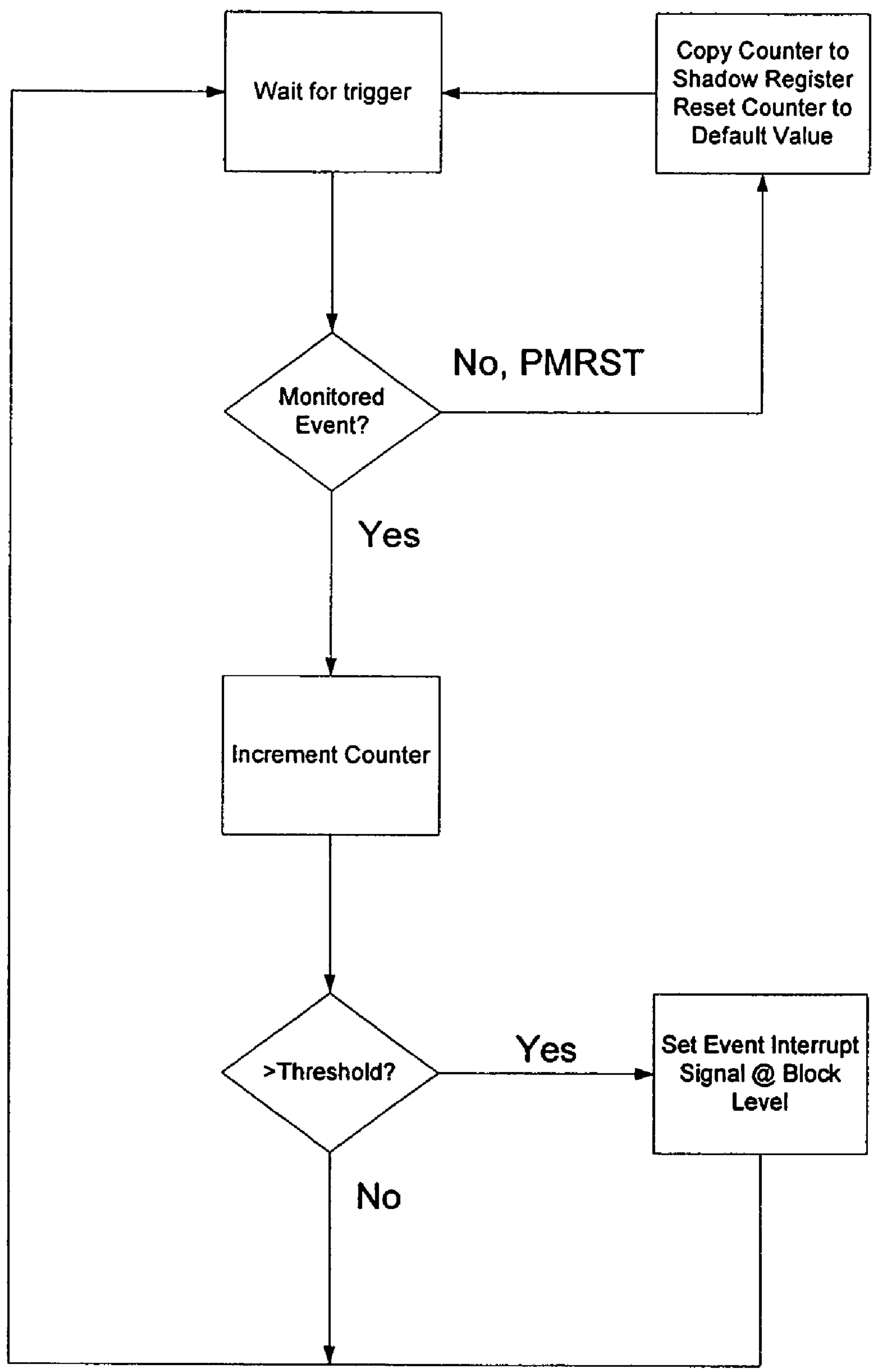
FIG. 12 is a flow chart illustrating PM counter processing according to an embodiment of the present invention.

Referring next to FIG. 12, techniques for performance monitoring of a cross-connect switch, such as switch 100 (FIGS. 1, 10, and 11) according to an embodiment of the present invention will be discussed. Performance monitoring may be supported at multiple levels within the switch, including VT, Low Order Path, High Order Path, and Line/Section. In one embodiment, there are two types of performance monitoring (PM) processing: events, and delta states. Events are associated with threshold crossing occurrences that stay valid until the event register is cleared/reset. Typically, events are associated with PM counters. Delta States are associated with situations that may be transient in nature, e.g. Loss of Frame (LOF). In one embodiment, when a state change occurs, e.g., asserting LOF, the transient is captured and locked into the associated delta register (discussed with reference to FIG. 13).

The event and delta registers may be cleared either upon reading, or by writing a zero to the event or delta register location. How the register is cleared may be determined by the COR_COWN register. To simplify the performance monitoring implementation, a reset signal (PMRS) can be used to synchronize the performance monitoring counters within a single switch element, or across an entire switch system.

In one embodiment, asserting the PMRS signal forces the performance monitoring registers to roll-over to shadow registers and reset to their default values. This is useful when it is desired to synchronize the performance monitoring information within a system to a common signal (PMRS). PMRS can be generated in response to software writing to the PMRS control register; in response to an interval timer, or in response to a hardware signal.

By utilizing the PMRS signal, a microprocessor can systematically poll each switch element for its performance monitoring data between PMRS signals. Since the performance monitoring information has been rolled over to shadow registers, the information in the registers is stable between PMRS signals. Interrupt mask registers and block summary indicators can be provided for PM indicators, thereby allowing fast response to critical performance indicators via interrupts and systematic reading of changed PM registers. Some embodiments provide a dedicated APS hardware interrupt to ensure fast responses to APS associated interrupts. Various embodiments can also be configured to automatically execute a protection switch for 1+1 and UPSR protected lines.

In some embodiment of the present invention, interrupts may be processed at four levels: At the device level, there are two interrupt signals from a switch element: INTERRUPT and APS_INTERRUPT. In one embodiment, a low-to-high transition on the INTERRUPT line indicates that an unmasked interrupt has occurred in at least one of the functional blocks. The APS_INTERRUPT signal may be dedicated to APS related interrupts to enhance SONET/SDH protection switching processing. The APS related interrupts can be included in the INTERRUPT indicator, but they may be masked if the APS_INTERRUPT is used. Each functional block within a switch element may independently generate interrupts, and in one embodiment more than one block can have an active interrupt at the same time as another block. In one form of the invention, these interrupts can be masked for each interrupt generated within a block. If an event is transient in nature, a “delta register” can be used to capture the transition event so that the information is available to an outside CPU when read. Threshold events trigger interrupts and in certain embodiments can be cleared by a read of the register.

According to some embodiments of the invention there is another level of interrupt processing for VT level PM information. In one such embodiment, for each VT there is a bit in the composite_delta_event register that indicates which VT has generated an interrupt. The exact interrupt can then be determined by examining the registers associated with that VT.

Figure 13:
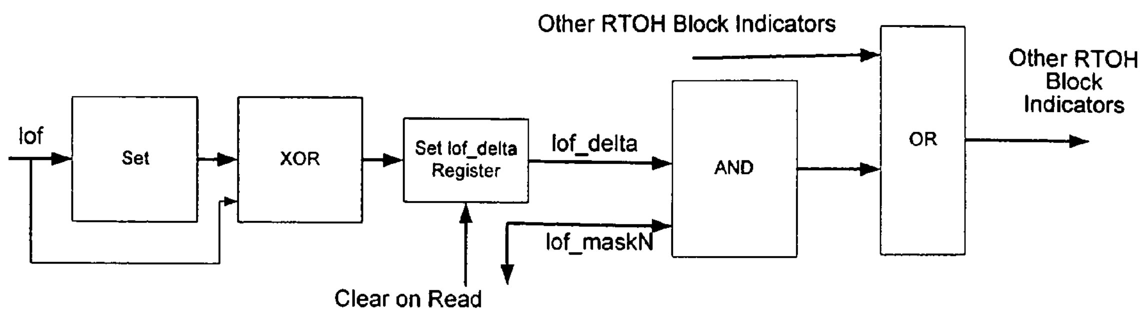
FIG. 13 is a block diagram illustrating generation of an LOF interrupt according to an embodiment of the present invention.
Figure 14:
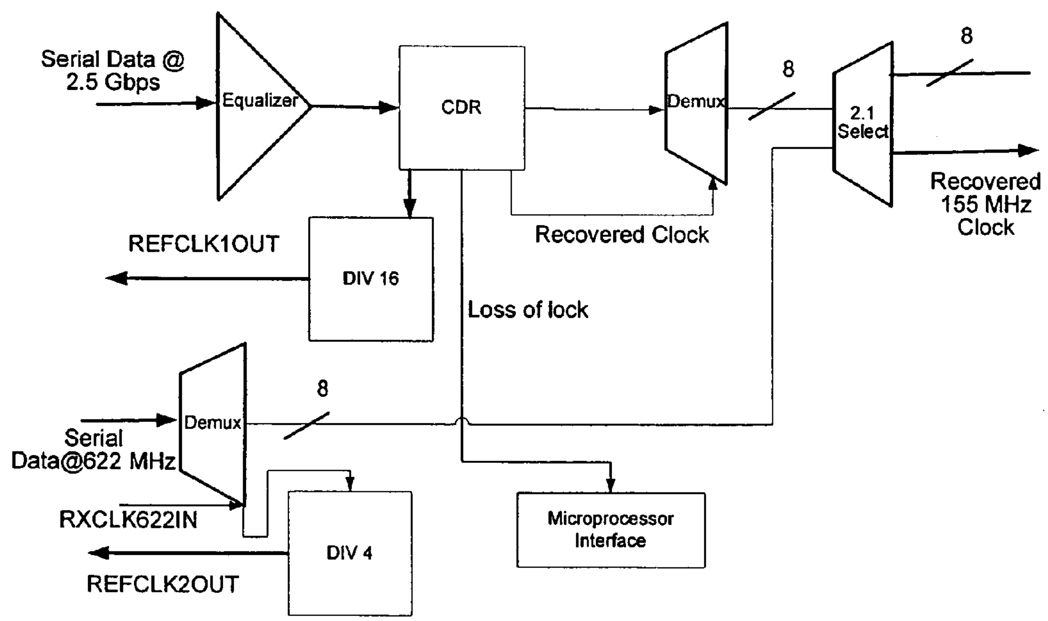
FIG. 14 is a block diagram of a serial receive interface according to an embodiment of the present invention.

Referring next to FIG. 13, an STS-48 Serial Receive Interface will be discussed according to an embodiment of the present invention. Recall that in at least one embodiment, a switch element may receive a 2.5 Gbps SONET data stream from the line as either a serial NRZ 2.5 Gbps signal or 4×622 signal. When the data is serial, an internal CDR recovers a clock from the serial STS-48 stream. If the 4×622 option is used, a receive clock can be used to clock the data.

The clock recovered from the incoming serial STS-48 signal (RXDIN) is, in one embodiment, divided by 16 to generate the REFCLK1OUT signal. A Loss of Lock register can be used to indicate the lock state of the internal Phased-Locked Loop (PLL). When searching for incoming data, the PLL attempts to acquire lock with the incoming data stream. According to one embodiment, during acquisition, the recovered clock frequency (RXCLK1OUT) drifts over a ±1000 ppm range relative to the supplied reference clock. If the 4× clocked inputs (RXDIN[3:0] and RXCLK622IN) are used, the CDR, serializer, and REFCLK1OUT can be disabled.

Figure 15:
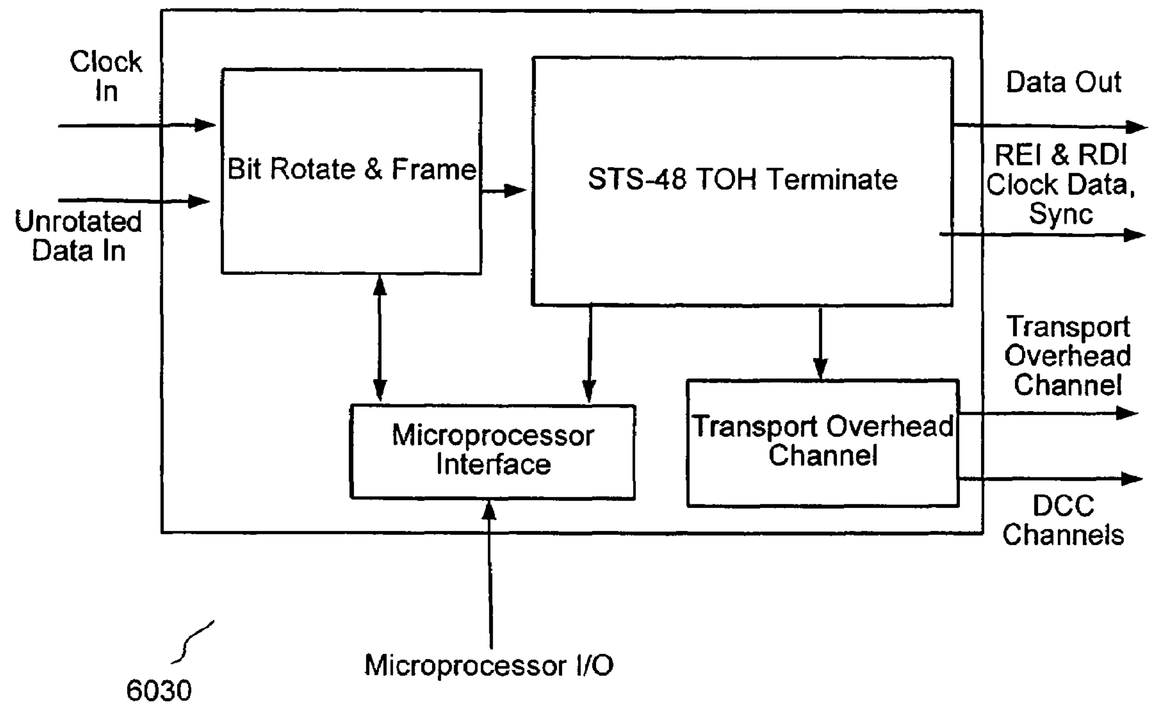
FIG. 15 is a block diagram of a receive transport overhead element of an integrated circuit according to an embodiment of the present invention.

Referring next to FIGS. 11 and 15, RTOH Block 6030 is discussed according to an embodiment of the present invention. SONET section and line information is terminated within the RTOH block. In one embodiment, this STS-48 SONET framer eliminates the need for external devices to frame SONET data streams externally before switching. In RTOH Block 6030, performance monitoring can be performed and reported to the system, user thresholds may be set to facilitate interrupts as well as automatic channel by channel switching, and DCC channels can be output (and input) on a dedicated interface to facilitate direct control of network maintenance functions. Additionally, access to SONET line and section OAM&P information is available through the microprocessor interface.

In at least one embodiment, RTOH 6030 frames on the incoming signal by detecting the 768 bit A1A2 framing pattern for two consecutive frames. In one embodiment, Switch 100 remains in frame until five consecutive framing patterns that contain errors occur, after which it transitions to the out-of-frame state. According to some embodiments, the input data is considered to be in loss-of-frame after being in the out-of-frame state for 24 consecutive frames. In these embodiments, the device may transition out of the loss-of-frame state once the input data has been in the in frame state for 24 consecutive frames.

One form of RTOH 6030 implements a 127 bit long frame synchronous descrambler using the polynomial x7+x6+1. The descrambler operates on the entire SONET frame with the exception of the first row of transport overhead, and can be disabled ($descramble_{13}$ disable) if desired.

In another embodiment, there is a 64 byte J0 capture sequence (j0_captured) and expected value sequence (j0_expected). The number of consistent new sequences that must be received before being captured can be programmable between 1-15 (j0_cntd) in some embodiments. The filtered value of the captured sequence can be compared to the expected value. A Trace Identifier mismatch (tim) results in a trace identifier mismatch delta (tim_delta). This event indication can be inhibited from contributing to the block interrupt by mask bits (tim_mask).

In one form of the invention, there are two mode control bits that determine the J0 operating mode (j0_mode). In a 1 byte mode, the J0 may be treated just as the other TOH bytes for capture. In any of the modes, the RTOH 6030 searches for a consistent new sequence for n consecutive patterns. In the SONET mode, the byte following the "CR" "LF" (0x0D, 0x0A) may be considered the first byte in the J0 frame.

In one embodiment of the present invention, RTOH 6030 also performs B1 termination, B2 termination, remote error detection, line detection, and APS detection. In such embodiments, valid B1 values are calculated and compared against the actual received B1 value (b1_error_count). These errors can be counted, e.g., in a 16-bit counter, which should be sufficient to count the B1 errors occurring each second. Whenever there is a non-zero bit error count at PMRST time, a B1 error event bit is set. As with other bits, this bit can contribute to the block interrupt, or it can be masked from contributing.

Valid B2 values may also be calculated and compared against the actual received B2 value. These errors are, in one embodiment, counted in a 22 bit counter, which should be sufficient to count every possible B2 error in a second. In some forms of the invention, whenever there is a non-zero bit error count at PMRST time, a B2 error event bit is set. As with the B1 error event bit, the B2 error event bit can contribute to the block interrupt, or it can be masked from contributing.

The B2 error count may also be monitored for signal degradation (SD) and signal failure (SF) conditions. The bit error rate values at which these indications are declared is user programmable in at least one embodiment. Both SD and SF conditions may be determined by the number of errors that occur in a programmable number of frames and/or m out of n blocks. Settings for detection and release are individually programmable in some embodiments.

In one embodiment, REI values are also monitored and counted by RTOH 6030. These REI errors may be counted in a 22-bit counter (rei_error_cnt. When there is a non-zero bit error count at PMRST time, an REI error event bit can be set (rei_event). REI error detection is, in one embodiment, implemented as a running counter and a shadow register, which presents the counts to the microprocessor interface. This shadow register may load new values whenever a PMRST signal is received.

One form of the RTOH 6030 captures the entire line and section overhead and creates a serial clock, data, and sync output. These outputs can be used to reinsert the overhead in the transmit direction if desired. In one embodiment, the sync output is a byte wide parallel signal with MSB of each overhead byte aligned with the data output. The data output signal nominally contains the 1296 bytes of the line and section overhead. The clock output is preferably aligned to the first A1 byte.

The DCC[1:3] and DCC[4:12] bytes are captured and presented via serial clock and data channel outputs. The channel rate is selectable between 192 kbps or 576 kbps using the DCC_Select register bit.

Referring again to FIG. 11, a receive high order pointer interpreter block (RHOPI) according to an embodiment of the present invention will be discussed. In one embodiment, the RHOPI block 6035 performs high order pointer interpretation as well as performance monitoring at levels from STS-1 to STS-48c. Preferably this performance data is kept in registers capable of storing a minimum of 1 second worth of error events and can be accessed via the microprocessor interface. The information may also be used in user thresholds to initiate automatic UPSR switching. Access to all SONET header information is preferably available through the microprocessor interface.

In one embodiment, three consecutive instances of AIS results in path AIS-P detection. This can be monitored for every STS-1 or STS-Nc signal. A delta bit can be associated with entering or exiting this state, and this bit can contribute to the block interrupt, or be masked from contributing. This delta may be squelched whenever a signal fail condition is present on the channel, and in one embodiment, eight consecutive invalid pointers results in loss of pointer detection. A delta bit may be associated with entering or exiting this.

In one embodiment, an NDF enable results in NDF event detection, which is monitored for every STS-1 or STS-Nc signal. An NDF event can be squelched whenever a signal fail condition is present on a monitored channel. Three consecutive consistent instances of new pointers may result in new pointer value detection.

In one embodiment, there are two operating modes for pointer increment/decrement acceptance. According to this embodiment, when in the majority mode, 3 of the 5 I bits and 3 of the 5 D bits need to agree in order to accept an increment/decrement. According to this embodiment, when not in the majority mode, if eight of the ten combined I and D bits agree, an increment/decrement may be accepted.

Pointer increment and decrement events may be monitored and counted using 12-bit counters on a one-per-STS-1 basis. For counts in excess of this value, internal running counts may hold at their maximum value. Following an active PMRST, these counts are latched and presented to the control interface. In one embodiment, a count value in excess of 0 generates an appropriate event, which can be masked from contributing to an interrupt. These count values may be squelched during either signal fail, AIS-P, or LOP-P conditions.

Switch 100 may indicate the presence of increments or decrements by overwriting the H2 byte. Such indications can then be used by downstream blocks to count the number of SPE bytes in an STS-1. Under the conditions of neither increments nor decrements, the H2 byte is, in one embodiment, set to 0x00. In this embodiment, if an increment is detected, the H2 byte may be set to 0x0F, and if a decrement is detected, the H2 byte is set to 0xF0.

Still referring to FIG. 11, a Receive Path Overhead (RPOH) Block 6045 will be discussed according to an embodiment of the present invention. The Switch 100 implements SONET framing functions for the OC-48 interface in the RPOH block 6045. In at least one embodiment, a full set of performance monitoring conditions can be monitored, and accessed via the microprocessor interface 6097. Thresholds may also be set for interrupt conditions and for automatic switching. Access to all SONET header information may also be available through the microprocessor interface.

In one embodiment, internal error counters count B3 or REI counts, and can operate in either the bit or block mode. In the bit mode, every bit in error contributes to the total count value. In the block mode, there is a single counter increment whenever any number of errors are detected.

In one form of the invention, valid B3 values are calculated and compared against the actual received B3 value for each STS-1 channel. B3 errors are, in one embodiment, counted in a 16-bit counter, which should be sufficient to count every possible B3 error in the bit mode in a second. A B3 error event bit may be set whenever there is a non-zero bit error count at PMRST time. Note that this event bit and the error counts may be squelched on any channel that is part of a larger, concatenated channel that is not the lowest STS in the concatenated signal. The same squelching may occur for all STS channels whenever either AIS-P or LOP-P is present on the channel.

A control bit can be set to exclude the two fixed stuff columns from the B3 calculation. This may be defaulted to SONET mode (B3 fixed stuff is enabled). In one embodiment, B3 error counts are sent to the transmit side for REI generation on a per frame basis. The B3 error count may also be monitored for B3 signal degrade and signal fail conditions. In at least one embodiment, the bit error rate values at which these indications are declared is user programmable. Both STS-1 SD and STS-1 SF conditions may be determined by the number of errors that occur in a programmable number of frames, and/or m out of n blocks. Settings for detection and release are, in some embodiments, individually settable. The value at which these indications are declared may also be user-programmable.

In another embodiment, valid G1 REI values, e.g. binary values between 0-8 on the four MSB of G1, are counted. Any binary value greater than 8 is considered to be no errors. Concatenation information may be taken into account in deciding which G1 bytes to monitor. These REI errors may be counted in a 16-bit counter for each STS-1 channel, which should be sufficient to count possible REI errors in the bit mode each second. Whenever there is a non-zero bit error count at PMRST time, an REI error event bit is set. As with the B3 error bit, this event bit and the error counts are squelched on any channel that is part of a larger, concatenated channel that is not the lowest STS in the concatenated signal. This same squelching may occur for all STS channels whenever either AIS-P or LOP-P is present on the channel.

In one embodiment, a payload label detection function monitors the received C2 byte for consistent new values. In such an embodiment, the number of consistent new values required for acceptance is programmable from 1-15. Accepted new C2 values are compared against an expected C2 value. If the new, received value differs from the programmed expected value, a payload label mismatch and a state change delta may be generated generated. If a new value of all 0 is accepted, a "path unequipped" indication may be generated along with the state change delta. If the new value is between 0xE1-0xFC, inclusive, a payload defect indication and a state change delta may be generated. As previously noted, delta indications can be inhibited from contributing to the block interrupt by mask bits, and may be squelched on any channel that is part of a larger, concatenated channel that is not the lowest STS in the concatenated signal. This same squelching may occur for all STS channels when AIS-P or LOP-P is present on the channel.

A preferred embodiment of RPOH Block 6045 can monitor on a per STS-1 channel basis for either one bit RDI or three bit enhanced RDI (ERDI) as directed by the user. In such embodiments, appropriate bits of the received G1 byte are monitored for consistent new values. The number of consistent new values required for acceptance may, in one embodiment, be programmable from 1-15. When a new G1 value is accepted, a remote defect indication and a state change delta may be generated. The new value for the four LSB of the G1 byte may also be captured and presented to the control interface.

In one embodiment, there is a 64 byte J1 capture sequence per STS-12 and expected value sequence per STS-12. The number of consistent new sequences to be received before being captured is, in one embodiment, programmable from 1-15. The filtered value of the captured sequence is compared to the expected value, and a mismatch may cause a trace identifier mismatch event to be indicated. The channel being monitored for the 16 or 64-byte sequences may be user selectable. In one embodiment, there are two mode control bits per STS-12 that determine the J1 operating mode. In a byte mode, the J1 is treated just as the other POH bytes for capture. In other modes, the block searches for a consistent new sequence for n consecutive patterns. In the SONET mode, the byte following the "CR" "LF" is considered the first byte in the frame. An event indicates that a consistent new value has been seen for n consecutive frames.

A Receive Low Order Pointer Interpreter (RLOPI) Block 6050 according to an embodiment of the present invention performs low order (VT-level) processing on the incoming SONET stream. This allows full processing of all VT groups within the data stream. Performance monitoring is done on a VT by VT basis and is accessible through the microprocessor interface. Statistics are kept on an individual VT basis and may be used to set thresholds for interrupts as well as automatic switching.

In one embodiment, the value of the expected SS bits in the descriptions below depends upon whether the signal is a VT1.5 or a VT2. If the signal is VT1.5, the expected SS bits are 11. If the signal is a VT2, the expected SS bits are 10. Three consecutive instances of AIS results in VT AIS-V detection (pais). This is monitored for every STS-1 signal, and there is a delta bit associated with entering or exiting this state that may contribute to the block interrupt, or be masked from contributing. This delta can be squelched if a signal fail condition is present on the channel.

In another embodiment, eight consecutive invalid pointers results in loss of pointer detection (LOP), which is preferably monitored for every VT1.5 signal. A delta bit may be associated with entering or exiting an LOP state. In another embodiment, an NDF enable may result in an NDF event detection. In one embodiment, NDF event detection is monitored for every STS-1 or STS-Nc signal. Both the LOP and NDF bit can contribute to the block interrupt, or can be masked from contributing, and may be squelched whenever a signal fail condition is present on the appropriate channel.

In one form of the invention, RLOPI block 6050 identifies the V5 byte location for each signal and adds this as the payload start mark indication. It may also identify the entire VT/TU SPE and marks these bits with a payload enable indication. RLOPI block 6050 may also check the BIP-2 for transmission errors. If BIP-2 errors are detected they are counted and contribute to the composite block interrupt, if enabled. Any errors may also be reported to the transmit direction for insertion into the transmit REI bit. Other embodiments of RLOPI block 6050 also check the REI and RFI bits for remote error indications respectively. If REI errors or RFI failures are detected, they are counted and contribute to the composite block interrupt, if enabled.

In one form of the invention, RLOPI block 6050 also checks the RDI bit for remote defect indications when in the 1-bit RDI mode. When in the enhanced RDI mode, the block may monitor not only the bit in the V5 byte but also the 3 MSB of the Z7 byte. If RDI is detected, it may contribute to the composite block interrupt, if enabled. The value of the enhanced RDI bits can also be captured and presented to the control interface.

Figure 16:
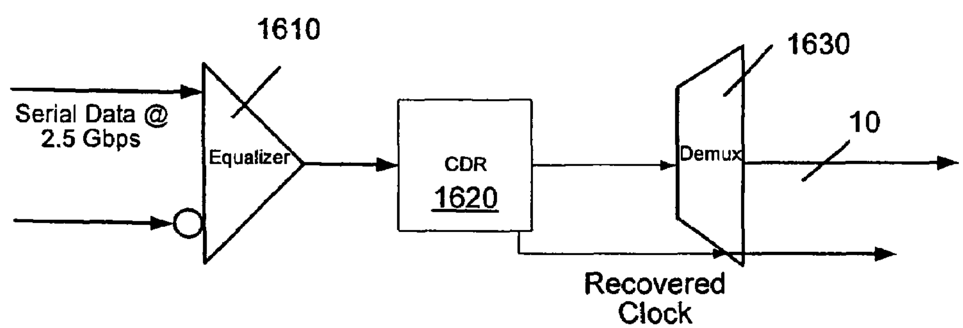
FIG. 16 is a block diagram of growth input receive circuitry according to an embodiment of the present invention.

Referring now to FIGS. 11 and 16, growth input receivers will be discussed according to an embodiment of the present invention. The growth input receivers 6020 provide high-sensitivity, high-jitter accommodation, and dynamic equalization to maximize tolerance of system impairments. In a preferred embodiment, the differential receivers 1610 are capable of operating across a large variety of input conditions and can receive from up to 40" of FR-4 trace. For short signal traces, the equalization circuitry can be turned off to reduce power consumption. In such an embodiment, the Growth Inputs should be ac coupled; however, dc coupling is possible when multiple switch elements 6010 are mounted on the same circuit pack and share common supplies and ground.

The receivers 6020 are capable of accommodating transmissions received from other switch elements allowing a distributed switch architecture to be employed with little, if any, degradation or added complexity. Each receiver preferably has its own CDR 1620, which allows each switch element to run clock independent from the others. The CDR 1620 tracks the data from each of the growth inputs and loads the recovered data into a buffer where serial-to-parallel conversion takes place. The data on the growth inputs is utilized by the switch function and retimed to the local device. A loss of lock may also be available to determine the status of a Growth Input Line.

Growth Input Block 6025 receives data from other connected switch elements. This data is forwarded to the cross-connect block 6060 and, if required, routed to the outgoing STS-48 frame formatter interface and/or the growth outputs.

In one embodiment, growth input block 6025 can also detect errors in the growth input framing pattern to isolate test system functionality and connectivity. PRBS detection may also be included for unframed BER analysis. Sequences supported include the following: 215, 220, 231, and fixed (programmable) 10-bit pattern.

In one embodiment, growth input block 6025 also monitors the framing bytes on all incoming signals, monitors and reports OOF conditions, and monitors for the line AIS condition. Growth input block 6025 preferably also implements a frame synchronous scrambler, which operates on the entire frame with the exception of the first row of transport overhead. This descrambler can be disabled. Additionally, in one embodiment valid B1-like values are calculated and compared to the received B1 byte, and received channels are synchronized to the local internal clock. Preferably, all output channels from growth input block 6025 are synchronized to the primary received input as they enter the cross-connect block 1060.

Figure 17:
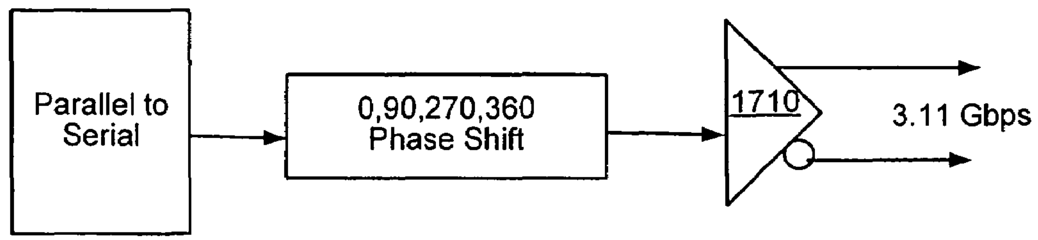
FIG. 17 is a block diagram of growth output bus drivers according to an embodiment of the present invention.

Referring next to FIGS. 11 and 17, growth outputs will be discussed according to an embodiment of the present invention. Growth I/O Output block 6070 selects which signals are transmitted by each of the growth output channels. The 32 channels carrying the processed information from this and/or other switch element channels are transmitted from growth output block 6070 and growth I/O transmit processing block (GIOTP) 6080. In at least one embodiment, growth output block 6070 also includes a PRBS generator and the ability to inject a programmable 10-bit pattern for system diagnostics.

In one embodiment, interconnection of switch 100 to other switches is accomplished through 31 transmit and 31 receive 3.1 Gbps ports. Each transmit port may include a differential CML driver 1710 capable of directly driving a backplane, two connectors, and conductors. One form of the transmit port has a number of programming options to enable transmission across a number of different environments.

In the embodiment including a PRBS generator, growth output block 6070 can be programmed to insert errors into the outgoing data stream that can be detected by receiving devices. In this way, system connectivity and switching can be verified and problems isolated. This can also be used to verify follow-on device functionality. Preferably, each growth output can be selected from the following: 1 of 32 growth inputs, the device's STS-48 transmission input, or the device's STS-48 transmission output. In one embodiment, when selecting from the primary data input, the user can select from either the VT processed or non-VT processed data.

In at least one embodiment, Growth output block 6070 reinserts the framing bytes for an STS-like frame based on an incoming frame sync pulse. In one form of the invention, the user can also force a programmable number of frame errors, up to 64 errored frames in a row. Growth output block 6070, in one embodiment, implements a 127 bit long frame synchronous scrambler using the polynomial x7+x6+1. The scrambler preferably operates on the entire frame with the exception of the first row of transport overhead, and can be disabled. In some embodiments, the user can optionally insert single bytes in error or continuous B1 bytes in error.

In one embodiment, the drivers 1700 associated with the growth output interface allow for programmable output levels and pre-emphasis. Driver voltage can be varied from 200 to 1000 mV with variable levels of pre-emphasis. In addition, slew rate can be controlled to minimize crosstalk. In a preferred form, the. drivers offer multiple output levels, 8 levels of pre-emphasis, and drive capabilities. To accommodate signal integrity design rules, the output of the drivers can, in at least one embodiment, be shifted by 0, 90, 270, and 360 degrees.

In one embodiment, the switch element utilizes a current-mode logic (CML) architecture to drive the high-speed serial output data on the growth output interfaces. Any ports that are not required can be powered down using control registers to save power. AC coupling capacitors and 50 ohm transmission lines should be used for proper operation. DC coupling is possible, for e.g., when the multiple switch elements are mounted on the same circuit pack and share common ground and power. Output drive level and pre-emphasis may be programmable through the system line driver control register.

Figure 18:
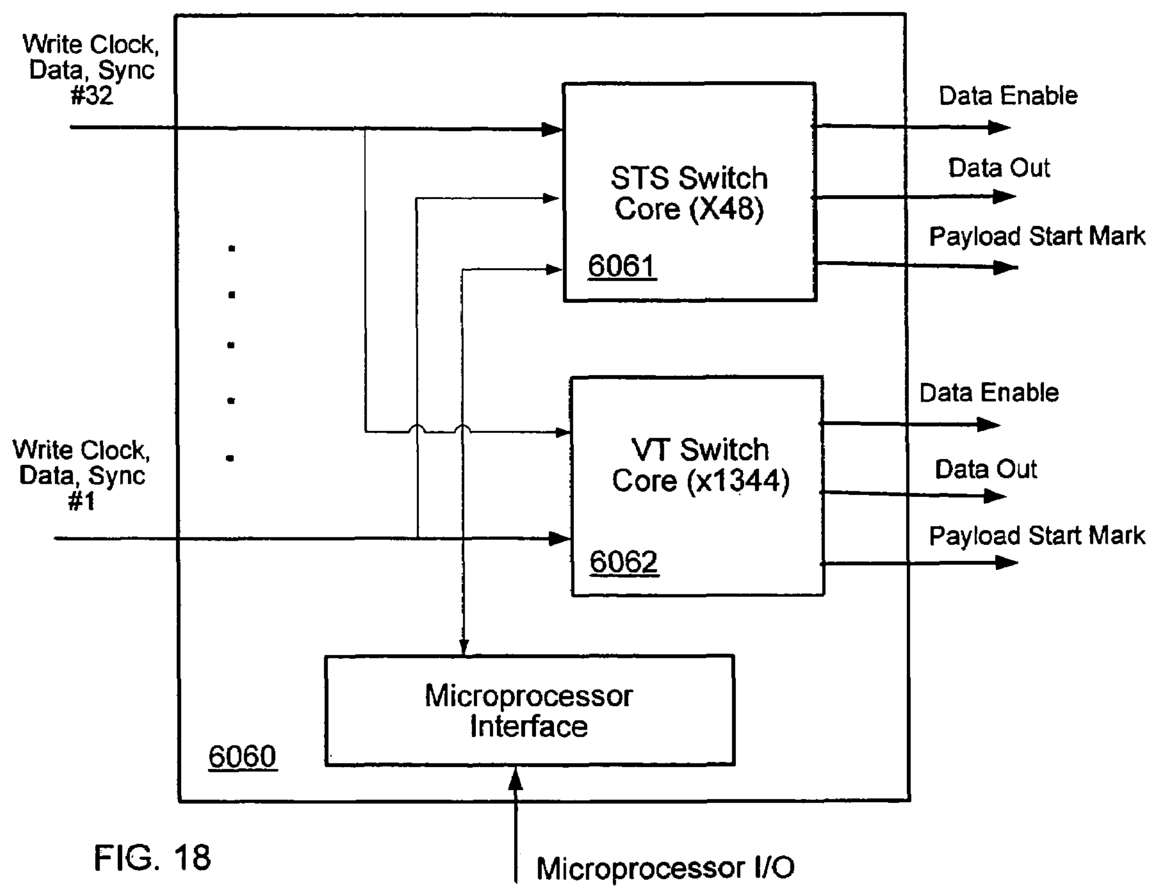
FIG. 18 is a block diagram of a cross-connect element of an integrated circuit according to an embodiment of the present invention.

Referring next to FIGS. 11 and 18, a cross-connect will be discussed according to an embodiment of the present invention. Cross-connect fabric 6020 is, in one embodiment, an 80 Gbps non-blocking single stage fabric. Extensive self test and fault isolation functions are preferably built into the block for use within a single switch 100, or between multiple devices or stages.

Cross-connect fabric 6060 preferably supports VT1.5 through STS-48c cross-connect, an in one embodiment supports broadcast of any input signal (VT1.5-STS-48c) to any output channels. In at least one embodiment, cross-connect fabric 6060 is configurable to allow any STS-48 input (signal source) to connect to any output signal (signal sink), and is capable of connecting any rate signal from VT1.5 to STS-48 to any output channel within the STS-48. The input channels can originate at the STS-48 input or any of the Growth Input ports.

In one embodiment, programming of the cross-connect fabric 6060 may be accomplished by specifying input port, channel, and output port on each device in the switch. When reconfiguration or APS is necessary, individual channels can be directly switched. For 1+1 redundancy, a shadow memory can be preprogrammed and switched to with one write. This allows a one-step reconfiguration to occur. If active channels remain unchanged, neither method disrupts the active, untouched channels. In at least one embodiment, UPSR APS can be programmed to switch automatically on a channel by channel basis at the outgoing port based on preset error thresholds.

Additional capabilities provided by cross-connect fabric 6060 include multistage switching and hitless bridge and roll: It is possible to coordinate switches in different offices to rearrange traffic so as to eliminate any re-framing errors. Cross-connect fabric 6060 also allows hitless 1+1 equipment switching, e.g. it is possible to synchronize the operations of the two independent switch element fault groups, such that a system can switch between them to execute a protection switch.

A user may provision the VT switch core 6062 with the source channel selection for each of the 1344 VT1.5 outputs or 1008 VT2. This source select control indicates which device in an array of up to 32 devices is the source STS-48, which, of 48 STS-1 signals within the STS-48, is the source STS-1, and which VT1.5/VT2 within the STS-1 is the source VT1.5/VT2. The user may also provision the VT switch core with the source channel type for each of the 1344/1008 VT1.5/VT2 outputs. This type select control indicates whether the source is a VT1.5 or VT2.

In one embodiment, the user provisions the STS switch core 6061 with the source channel selection for each of the 48 STS-1 outputs. This source select control indicates which of up to 32 connected devices is the source STS-48, which of 48 STS-1 signals within the STS-48 is the source STS-1, and whether the block should switch STS-1, STS-3c, STS-12c, or STS-48c.

In one embodiment, the user provisions the source of the STS-1 OH from either the TLOPG 6055 or the THOPG 6065. The user provisions the source of the transmit STS-1 REI/RDI insertion as either the local received channel or the UPSR selected channel. Using the UPSR selected channel allows the remote STS-1 REI/RDI information to propagate from both working and protect STS-1 channels.

Provisioning a cross-connect fabric 6060 may be done on the egress side of the device by associating an input STS/VT with an output STS/VT within the device register map. For STS-level cross-connects, the user may identify the source of the STS signal by specifying the source STS-48 (this corresponds to either the receive data or the Growth Input pin the signal is on), the specific STS signal within that STS-48, and finally the output STS slot. In one embodiment, this is provisioned via a source select register. For VT level cross-connects, the user may identify the source of the VT signal by specifying the source STS-48 (this corresponds to either the receive data or the Growth Input pin the signal is on), the specific STS-1 signal within that STS-48, and finally which VT within that STS-1, the output STS slot. This may also be provisioned via a source select register.

STS and VT level UPSR can be provisioned in similar steps: (1) Establish the cross-connect for the working and protection lines; (2) Configure the switch thresholds; and (3) Enable UPSR switching on the channels, including RDI/ERDI pass-through. UPSR switching may then occur automatically, or may be forced by a register command.

Referring again to FIG. 11, a transmit low order pointer generator (TLOPG) will be discussed according to an embodiment of the present invention. Full low order and high-order pointer processing is preferably performed on all outgoing data to facilitate the cross-connect of all levels of channels that are performed in the TLOPG Block 6055.

The elastic store may be monitored for overflow/underflow conditions. This bit can contribute to the block interrupt, or it can be masked from contributing. Under such conditions, the block re-centers the elastic store and sends an NDF indication.

In one embodiment, during normal operation the output pointer bytes, V1 and V2, have NDF disabled; the pointer value locates the V5 byte, and V1 bits, 5 and 6, are programmable SS bits. The pointer and payload are aligned to the received frame sync, which is the first A1 indication from the TTOH block. The pointer value is changed by increment/decrement or new alignment operations. No increment or decrement operation is allowed for three frames following any increment/decrement or NDF enabled.

If an increment is required, the current pointer value is transmitted with the I-bits inverted, and the corresponding increment byte is considered an undefined byte. These events are reported to the control system. This bit can contribute to the block interrupt, or it can be masked from contributing. Subsequent pointers contain the previous pointer value incremented by one. The frequency of increments may be reported to the control interface.

In one embodiment, if a decrement is required, the current pointer value is transmitted with the D-bits inverted, and the corresponding decrement byte is overwritten with an SPE/VC payload byte. Subsequent pointers contain the previous pointer value decremented by one. The frequency of decrements is reported to the control interface.

If the alignment of the V5 byte changes for any reason other than increment/decrement operations, the new pointer value is preferably sent with an NDF enabled. The frequency of NDFs is reported to the control interface. In one embodiment, the NDF indications appear in the first frame that contains the new value. The next V5 byte is at the first occurrence of the offset indicated by the new pointer value.

In at least one embodiment, when AIS-V is received on the incoming V1 and V2 bytes, the pointer generator is able to insert path AIS immediately, which is all is for the entire VT1.5/VT2. Also, AIS can be manually inserted into individual VT1.5/VT2 signals.

Still referring to FIG. 11, a transmit high order pointer generator (THOPG) will be discussed according to an embodiment in the present invention. The THOPG block generates pointer information for each STS channel. The elastic store is monitored for overflow/underflow conditions. Under such conditions, the block re-centers the elastic store and sends an NDF indication.

In at least one embodiment, during normal operation, the output pointer bytes, H1 and H2, have NDF disabled, the pointer value locates the start of the STS SPE, and H1 bits, 5 and 6, are programmable SS bits. The pointer and payload are aligned to the received frame sync, which is the first Al indication from the TTOH block 6085. If the payload type is concatenated (as determined by the input control signals), a set of normal pointer bytes, H1 and H2, is generated for the first STS-1. The concatenation indicator, 1001SS1111111111, may be inserted in the other pointers.

In one embodiment, increment/decrement or NDF indicated by the pointer in the first STS-1 apply to each STS-1 within the concatenated signal. The pointer value is changed by increment/decrement or new alignment operations. Preferably, no increment or decrement operation is allowed for three frames following any increment/decrement or NDF enabled. If an increment is required, the current pointer value is transmitted with the I-bits inverted, and the corresponding increment byte is considered an undefined byte. Subsequent pointers contain the previous pointer value incremented by one. If a decrement is required, the current pointer value is transmitted with the D-bits inverted, and the corresponding decrement byte is overwritten with an SPE payload byte. Subsequent pointers contain the previous pointer value decremented by one.

In at least one embodiment, if the alignment of the SPE changes for any reason other than increment/decrement operations, the new pointer value is sent with an NDF enabled. The frequency of NDFs is reported to the control interface. The NDF indications only appear in the first frame that contains the new value. The new SPE begins at the first occurrence of the offset indicated by the new pointer value.

In one embodiment, when AIS-P is received on the incoming H1 and H2 bytes, the pointer generator is able to insert path AIS immediately, which is all Is for the entire SPE including pointer bytes, on a per STS-1 basis. Also, AIS can be manually inserted into individual STS-1 signals.

Still referring to FIG. 11, a particular embodiment of a transmit path overhead (TPOH) block will be discussed. TPOH block generates SONET path overhead as necessary, and makes the overhead bytes accessible via the microprocessor interface. In at least one embodiment, TPOH 6075 can select either the THOPG 6065 or the TLOPG 6055 as the source of the data for any of the STS-1 signals. In one form of the invention, if the THOPG 6065 is selected as the data source, all of the path overhead is passed through this block transparently, and if the TLOPG 6055 is selected as the data source, all of the path overhead is inserted as described below.

In at least one embodiment, valid B3 values are calculated and inserted. Note that errors can be inserted per STS-1 under user control. These error insert bits may be of the one-shot type, so that a user only needs to program them to a one; the THOPG block automatically resets them after the error has been inserted. In one embodiment, REI information is received from the backreporting channel (or from any designated STS-n). Valid REI values in a particular embodiment range from 0-8, and the REI can be inserted as the four MSB of the G1 byte. Once per frame, the REI information from the backreporting channel is latched into the local clock domain.

Still referring to FIG. 11, a transmit trace overhead (TTOH) block according to an embodiment of the present invention will be discussed. The TTOH block 6085 manages section and line overhead of the STS-48 signal. The actual value used for the overhead bytes can be set by the user as a single programmable bit. This bit can be replicated as many times as needed for overhead default locations.

In one embodiment, TTOH block 6085 inserts the framing bytes, A1 and A2, based on an incoming frame sync pulse and a programmable output frame offset. The user can also force a programmable number of A1A2 frame errors. In one form, TTOH block 6085 implements a 127 bit long frame synchronous scrambler using the polynomial x7+x6+1. The scrambler operates on the entire SONET frame with the exception of the first row of transport overhead, and can be disabled. In one embodiment, there is a 64 byte J0 insert sequence that can be used to insert any of the required J0 sequences (1 byte—repeat the same byte 64 times, 16 byte—repeat the same sequence 4 times, or full 64 byte). The user can optionally select the transparent overhead passthru mode (j0_mode).

In one embodiment, valid B1 values are calculated and inserted into the transmitted B1 byte. The user can optionally insert single bytes in error or continuous B1 bytes in error. Valid B2 values can be calculated and inserted into the transmitted B2 bytes. The user can optionally insert single bytes in error or continuous B2 bytes in error. In one form of the invention, valid M1 REI values, e.g. binary values between 0-255 (truncated from a maximum of 384) on the third STS-1 (in order of appearance), are inserted based on the receive reverse reporting channel. The user can optionally insert single bytes in error or continuous B2 bytes in error, and/or inhibit the REI insertion.

The illustrated embodiment of TTOH block 6085 also inserts a sync status byte based on a programmed value. The user can optionally select the transparent overhead passthru mode. Additionally, TTOH block 6085 may insert the line and section overhead bytes. A number of these bytes can be set to one of two modes: fixed or pass-through from the receive TOH. One embodiment of switch 100 allows for user data to be inserted into the outgoing TOH channel, which is accomplished using the Transmit Transport Overhead pins.

One embodiment of TTOH block 6085 inserts both the DCC1-3 and DCC4-12 bytes. The DCC byte data is generally one of three types: (1) Fixed (per a TOH default); (2) Input from the external device I/O; or (3) Pass-through from the receive TOH. TTOH block 6085 supplies a serial clock to the device output and reads the data based on this output clock for option 2. These channels can be routed without further processing to/from controllers. The user can optionally select the transparent overhead passthru mode.

Figure 19:
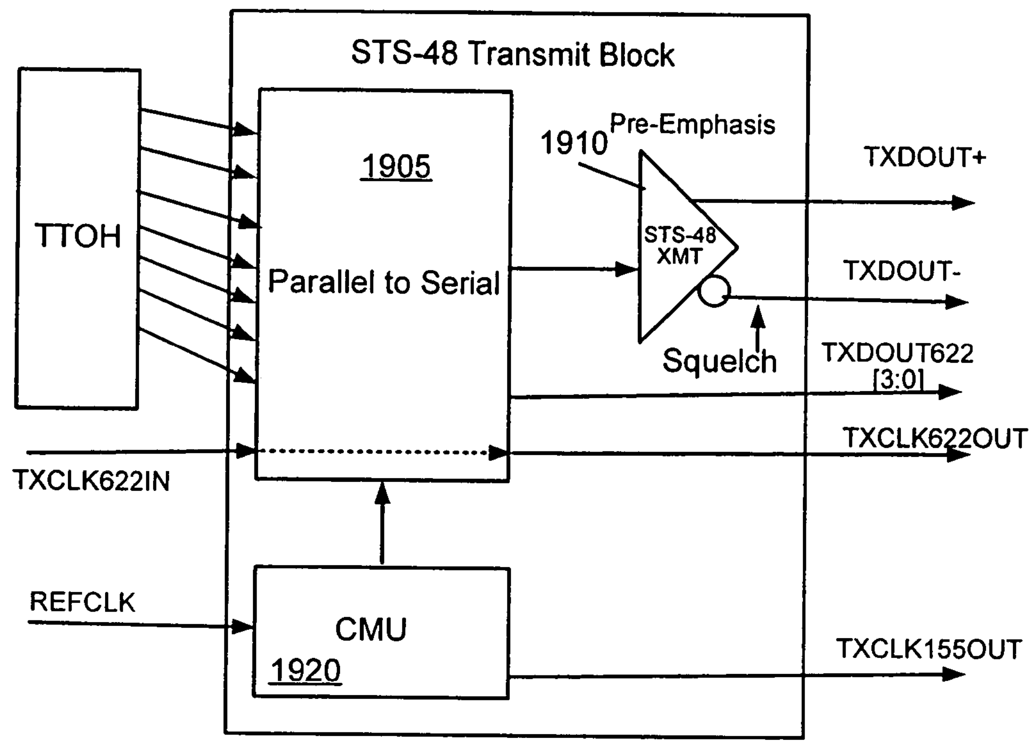
FIG. 19 is a block diagram of a transmit element of an integrated circuit according to an embodiment of the present invention.

Referring next to FIGS. 11 and 19, an STS-48 transmit interface block according to an embodiment of the present invention will be discussed. STS-48 interface 6090 provides data at either the line rate for direct connection to an optical module, or a 4-bit parallel interface 1905 at 622 MHz for interfacing to a transceiver. The line rate of 2.5 Gbps incorporates a pre-emphasis circuit 1910 and two high-speed connectors.

In one embodiment, the transmit SERDES of the Switch 100 is a serial SONET stream at 2.5 Gbps or a 4×622 Mbps interface carrying the SONET stream. It is designed to connect to a SONET line through a module that can meet SONET transmit timing specifications.

To facilitate circuit pack layout, switch 100 incorporates a pre-emphasis circuit 1910 on the TXDOUT signal. The settings for this circuit may be controlled via a pre-emphasis control register. To prevent the transmission of corrupted data into the network, a control bit can be used to force TXDOUT to 0.

In one embodiment, the multiplier unit (CMU) 1920 utilizes digital phase-locked loop approaches to generate a low jitter, high frequency clock source capable of producing a high-speed serial clock and data output. This is achieved by using a digital signal processing (DSP) algorithm to replace the loop filter commonly found in analog PLL designs. Clock frequency conversions in the transmit direction are preferably done within the transmit CMU.

Figure 20:
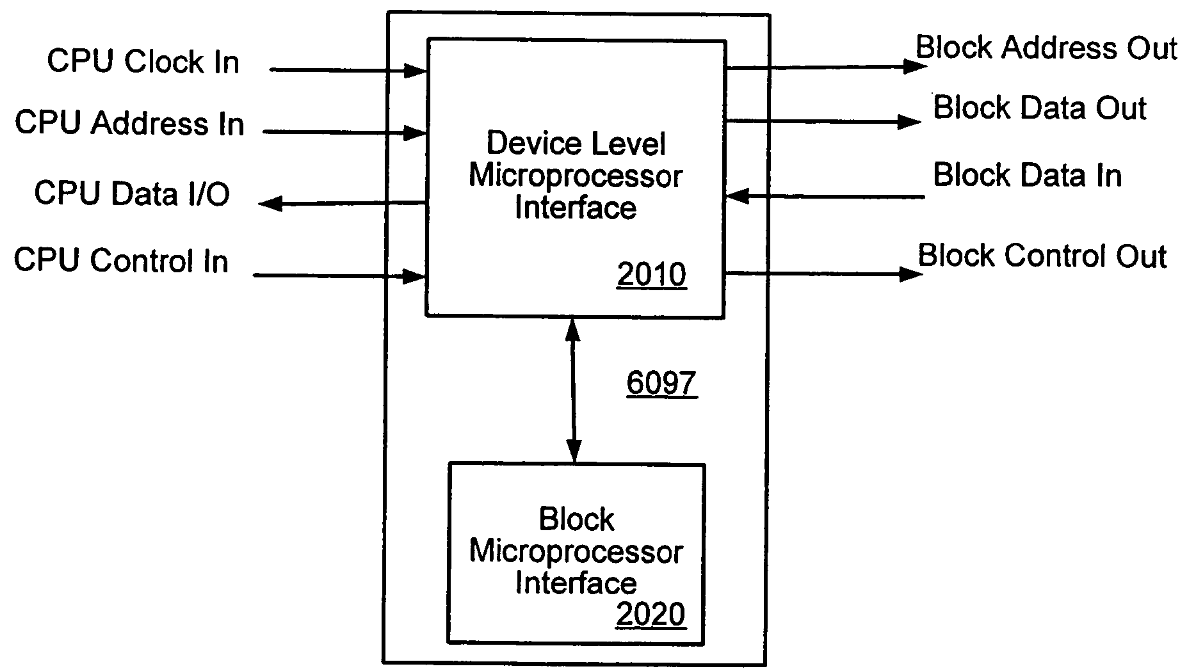
FIG. 20 is a block diagram of a processor interface of an integrated circuit according to an embodiment of the present invention.

Referring next to FIGS. 11 and 20, a microprocessor interface according to an embodiment of the present invention will be discussed. Switch 100 is, in one embodiment, controlled via a 32-bit microprocessor interface, such as a simplified Motorola 60x bus style interface operating at 66 MHz. The bus interface is designed to simplify the interfacing between switch 100 and a microprocessor. The switch 100 also processes much of the real-time activity required within SONET systems to reduce processor interaction. Signals for the microprocessor data bus are described below. Note that the CPU may be independent of the other clocks used within the 100, and data transfers over the control bus are preferably timed relative to the CPU's clock.

In one embodiment, when the Read/Write (RWN) input is asserted, the data transfer cycle is a data read from switch 100. When negated, the transfer cycle may be a write to switch 100. This should be established during the same clock cycle as the ADSN. Registers accessible via the microprocessor interface are, in one embodiment, in a 20-bit address space specified by ADDR [19:0]. Odd parity protection bits can be provided of the address bus.

Data may be provided on DATA [31:0]. The MSB of the internal 32 bit registers are mapped as the DATA31 line. During a write to the switch 100, switch 100 copies the incoming data from the DATA[31:0] lines into the register selected by the address bus. During a read from the register designated by the address bus, the switch 100 copies the contents of the designated register to the DATA[31:0] lines. The switch 100 may enforce odd parity on the data in 8-bit words. An invalid data parity results in an interrupt Microprocessor interface 6097 preferably includes a version number register as well as a register set that returns ASCII PPXC as a device identifier. The interrupt status from each of the functional blocks of switch 100 may be consolidated into a single register (not illustrated). In a particular embodiment, each block interrupt signal is treated as a state with an associated delta bit. In addition, there may be top level event interrupts that occur whenever the performance monitor reset (PMRST) signal transitions from low to high, and whenever there are parity errors on the device input received data bus. Reading this register can allow the user to determine which block(s) is currently indicating interrupt. These interrupt signals may also be combined to create a single composite device interrupt. Any of these indications can be masked from contributing to the composite device interrupt.

In at least one embodiment, Microprocessor interface 6097 includes performance monitor counters in a number of functional blocks. Synchronization of these registers may be controlled by a single performance monitor reset indication from the microprocessor interface block 6097. This monitor can either be driven by software, by a device input pin, or controlled by an internal counter driven by the CPU clock input. These counters can all be set to either saturate at their maximum counts or rollover to zero following their maximum counts.

Microprocessor interface 6097 preferably includes a scratch pad register for read write validation. This register may be used during initialization to verify the communications path between a control processor and the switch element 6010.

In one embodiment, each switch, such as switch 100, operates on a local clock within SONET clock accuracy (±20 ppm), jitter, and duty cycle requirements. The individual switch elements in a switch array do not have to be synchronized to the same clock. Each switch element retimes incoming data from the STS interface and the growth inputs to the local reference clock. All growth outputs and the SONET output can be timed to the local reference. Due to the structure of the switching process, in at least one embodiment no special accommodations need be made for skew between devices or growth lines.

In one embodiment, the local reference clock is used as the primary synchronization clock for switch 100. The device synchronizes internal data to the supplied reference regardless of the state of the incoming STS-48 data. This reference clock is preferably 155 MHz. The source of this clock may be derived from the system reference or the line, as long as it meets the reference requirements of switch 100, which facilitates timing synchronization by making divided down versions of the receive clock available to the system (RXCLK1OUT, RXCLK20UT).

In one embodiment, RXCLK1OUT is recovered from the 2.5 Gbps receive data, and RXCLK20UT is divided down from the RXCLK622IN clock. During reset periods, RXCLK1OUT and RXCLK20UT are not valid and a valid clock should be present on REFCLK. For correct operations, CALCLK should be tied to REFCLKOUT or to the same 155 MHz clock source that is used for REFCLK.

Thus, an approach for providing a switch with additional growth inputs and outputs has been described. While the description herein has been primarily directed to SONET operations, the embodiments described herein can also be applied to supports other types of operations in addition to SONET operations. The description of the invention set forth herein is illustrative, and is not intended to limit the scope of the invention as set forth in the following claims. Other variations and modifications of the embodiments disclosed herein, may be made based on the description set forth herein, without departing from the scope and spirit of the invention as set forth in the following claims.

What is claimed is:

1. An integrated circuit cross-connect switch comprising:

a transmission input port for receiving communications data;

a transmission output port for supplying transmission output data;

a plurality of growth inputs;

a plurality of growth outputs, each of the growth outputs being selectively coupled to one of, the transmission input port, one of the growth inputs, and to data being supplied to the transmission output port, and wherein the growth inputs and outputs are utilized for forming a distributed switch distributed over a plurality of integrated circuit cross-connect switches including the integrated circuit cross-connect switch; and an additional growth input and growth output not needed for forming the distributed switch, wherein the additional growth output is selectively coupled to one of the transmission input port, one of the growth inputs, the additional growth input, and data being supplied to the transmission output port.

2. The integrated circuit as recited in claim 1 wherein the growth inputs and outputs support high speed serial data streams.

3. An apparatus comprising:

a plurality of integrated circuits, each of the integrated circuits including, a transmission input port for receiving communications data;

a transmission output port for supplying transmission output data;

a first group of growth inputs and a first group of growth outputs, each of the growth inputs and outputs coupled to at least one of the other integrated circuits; and at least one extra growth input and one extra growth output, wherein the apparatus comprises N integrated circuits, N being greater than or equal to 4 and wherein the first group of growth inputs and the first group of growth outputs are formed by least N−1 growth inputs and outputs, respectively.

4. The apparatus as recited in claim 3 wherein the apparatus is coupled as a distributed switch in which the integrated circuits are coupled in a unidirectional ring utilizing the growth inputs and outputs.

5. The apparatus as recited in claim 4 wherein the first group of growth outputs are coupled to one of the plurality of integrated circuits and the first groups of growth inputs are coupled to another of the plurality of integrated circuits.

6. The apparatus as recited in claim 3 wherein the apparatus is coupled as a distributed switch in which the integrated circuits are coupled in a bi-directional ring utilizing the growth inputs and outputs.

7. The apparatus as recited in claim 3 wherein a first portion of the first group of growth inputs and a first portion of the first group of growth outputs are coupled to one of the integrated circuits in the bi-directional ring and wherein a second portion of the first group of growth inputs and a second portion of the first group of growth outputs are coupled to another of the integrated circuits in the bi-directional ring, the first and second portions of the growth inputs having identical data information being transmitted thereon, and the first and second portions of the growth outputs having identical data information being transmitted thereon, thereby allowing information in the distributed switch to flow in either direction in the bi-directional ring.

8. The apparatus as recited in claim 3 wherein the apparatus is coupled as a distributed switch in which the integrated circuits are coupled in a full mesh network utilizing the growth inputs and outputs in which each integrated circuit is coupled to each of the other integrated circuit though respective ones of the first group of growth inputs and the first group of growth outputs.

9. The apparatus as recited in claim 3 wherein the apparatus is coupled as a distributed switch formed by the integrated circuits functioning as working channel devices receiving data from respective communication channels into their respective transmission input ports and wherein the apparatus further comprises an additional device functioning as a protection channel device, the additional device including, a transmission input port for receiving communications data;

a plurality of protection channel device growth inputs and a plurality of protection channel device growth outputs;

a transmission output port selectively coupled to one of the transmission input port and one of the protection channel device growth inputs for supplying transmission output data; and wherein the protection channel device is coupled to receive on the protection channel device growth inputs, respective working channel data information from respective extra growth outputs of the working channel devices.

10. The apparatus as recited in claim 9 wherein respective protection channel device growth outputs are coupled to respective extra growth inputs of the working channel devices.

11. The apparatus as recited in claim 9 wherein responsive to a failure condition in which an output of a particular working channel device fails, the protection channel device is coupled to the transmission output port of a particular protection channel device growth input coupled to receive data from the extra growth output of the particular working channel.

12. The apparatus as recited in claim 11 wherein the apparatus selects the protection channel transmission output port to replace an output port of the particular working channel device.

13. The apparatus as recited in claim 9 wherein responsive to a failure condition associated with a transmission input port of a particular working channel device, the protection channel device is coupled to a working channel that is coupled to the particular working channel device with the failure condition, and the working channel device couples its extra growth input, which is coupled to the protection device, to its transmission output port.

14. An apparatus comprising:

a plurality of integrated circuits, each of the integrated circuits including, a transmission input port for receiving communications data;

a transmission output port for supplying transmission output data;

a first group of growth inputs and a first group of growth outputs, each of the growth inputs and outputs coupled to at least one of the other integrated circuits; and at least one extra growth input and one extra growth output, wherein the integrated circuits are coupled in a distributed switch and function as working channel devices receiving data from respective communication channels into their respective transmission input ports and wherein the apparatus further comprises at least M additional devices functioning as a protection channel device, M being an integer greater than one, each of the M additional devices including, a transmission input port for receiving communications data;

a plurality of protection channel device growth inputs and a plurality of protection channel device growth outputs;

a transmission output port selectively coupled to one of the transmission input port and one of the protection channel device growth inputs for supplying transmission output data; and wherein each of the working channel devices includes at least M extra growth inputs and outputs that are coupled to the M protection channel devices, thereby providing M protection devices for the working channel devices.

15. The apparatus as recited in claim 3 wherein the integrated circuits are coupled in a distributed switch and function as working channel devices receiving data from respective communication channels into their respective transmission input ports and wherein the apparatus further comprises at least one additional device functioning as a protection channel device for one of the integrated circuits, the additional device including, a transmission input port for receiving communications data;

a plurality of protection channel device growth inputs and a plurality of protection channel device growth outputs;

a transmission output port selectively coupled to one of the transmission input port and one of the protection channel device growth inputs for supplying transmission output data; and wherein the extra growth output and extra growth input of the one of the integrated circuits is coupled to the protection channel device.

16. An apparatus comprising:

a plurality of integrated circuits, each of the integrated circuits including, a transmission input port for receiving communications data;

a transmission output port for supplying transmission output data;

a first group of growth inputs and a first group of growth outputs, each of the growth inputs and outputs coupled to at least one of the other integrated circuits; and at least one extra growth input and one extra growth output, wherein the apparatus is coupled as a two stage switch having a first and second stage, the first stage receiving 2N communication channels, and the second stage supplying 2N communication channels, N being an integer greater than or equal to 4, and wherein the growth inputs and outputs of a first group of N integrated circuits of the first stage are coupled, wherein the growth inputs and outputs of a second group of N integrated circuits of the first stage are coupled, and wherein the growth inputs and outputs of a first group of N integrated circuits of the second stage are coupled, wherein the growth inputs and outputs of a second group of N integrated circuits of the second stage are coupled, and wherein respective extra growth outputs of the first group of N integrated circuits are coupled to respective growth inputs of the second group of N integrated circuits of the second stage; and wherein respective extra growth outputs of the second group of N integrated circuits are coupled to respective growth inputs of the first group of N integrated circuits of the second stage.

17. A method for use with a plurality of integrated circuit cross-connect switches, the method comprising:

coupling the plurality of integrated circuit cross-connect switches to form a communications switch, each of the plurality of cross-connect switches including a number N of growth inputs and a number M of growth outputs, where N and M are integers greater than one, wherein coupling the integrated circuit cross-connect switches includes:

coupling at least one and no more than N−1 growth outputs of the first integrated circuit cross-connect switch to respective growth inputs of other integrated circuit cross-connect switches of the plurality of integrated circuit cross-connect switches;

coupling at least one and no more than M−1 growth inputs of the first integrated circuit cross-connect switch to respective growth outputs of the other integrated circuit cross-connect switches; and coupling at least one adjunct device to the communications switch using the Nth growth output and the Mth growth input of at least one of the integrated circuit cross-connect switches.

18. The method of claim 17 wherein coupling the at least one adjunct device includes coupling at least one protection channel device to the communications switch.

19. The method of claim 18 wherein the at least one protection device is an additional integrated circuit cross-connect switch configured for use as a protection device.

20. The method of claim 17 wherein coupling the at least one adjunct device includes coupling at least one transmultiplexer to the communications switch.

21. The method of claim 17 wherein N and M are integers greater than 4.

22. The method of claim 20 wherein the transmultiplexer is coupled to the communications switch using the Nth growth output and the Mth growth input of each of at least two of the plurality of cross-connect switches.

23. The integrated circuit of claim 1 wherein the additional growth output is selectively coupled to a line generator circuit configured to reconstruct a data stream into a predetermined transmission format.

* * * * *